| (12) | United States Patent | (10) Patent No.: | US 10,560,657 B2 |
|---|---|---|---|
| | Noel | (45) Date of Patent: | *Feb. 11, 2020 |

(54) SYSTEMS AND METHODS FOR INTELLIGENTLY SYNCHRONIZING EVENTS IN VISUAL CONTENT WITH MUSICAL FEATURES IN AUDIO CONTENT

(71) Applicant: GoPro, Inc., San Mateo, CA (US)

(72) Inventor: Jean-Baptiste Noel, Le Vesinet (FR)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/402,601

(22) Filed: May 3, 2019

(65) Prior Publication Data

US 2019/0289254 A1    Sep. 19, 2019

Related U.S. Application Data

(63) Continuation of application No. 15/436,422, filed on Feb. 17, 2017, now Pat. No. 10,284,809.

(Continued)

(51) Int. Cl.
*H04N 5/93*    (2006.01)
*G11B 27/031*    (2006.01)
(Continued)

(52) U.S. Cl.
CPC ......... *H04N 5/9305* (2013.01); *G11B 27/031* (2013.01); *G11B 27/34* (2013.01); *H04N 5/91* (2013.01)

(58) Field of Classification Search
CPC ......... G11B 27/02; G11B 27/03; G11B 27/34; G11B 27/031; G10H 2210/076;
(Continued)

(56) References Cited

U.S. PATENT DOCUMENTS 5,130,794 A    7/1992  Ritchey
6,337,683 B1   1/2002  Gilbert
(Continued)

FOREIGN PATENT DOCUMENTS

WO    2001020466        3/2001
WO    2009040538 A1     4/2009

OTHER PUBLICATIONS

PCT International Written Opinion for PCT/US2015/041624, dated Dec. 17, 2015, 7 Pages.

(Continued)

*Primary Examiner* — David E Harvey
(74) *Attorney, Agent, or Firm* — Esplin & Associates, PC

(57) ABSTRACT

Systems for synchronizing events or transitions in visual content with musical features in audio content are configured to obtain audio and visual content; determine a minimum, maximum, and/or a target display duration for items of visual content; determine a first playback-time in the first audio content to associate with a start-of-display time for the first visual content; identify a first timeframe in the first audio content corresponding to a range of acceptable end-of-display times for the first visual content; identify musical features within the first timeframe; identify a candidate musical feature among the identified musical features in accordance with a hierarchy; and/or define a first candidate end-of-display time that aligns with the playback time of the candidate musical feature. A set of candidate end-of-display times are defined for multiple visual content items in a single multimedia project, the set identified by seeking a solution that increases rank among the hierarchy.

20 Claims, 5 Drawing Sheets

Related U.S. Application Data

(60) Provisional application No. 62/418,712, filed on Nov. 7, 2016.

(51) Int. Cl.
  *G11B 27/34* (2006.01)
  *H04N 5/91* (2006.01)

(58) Field of Classification Search
  CPC .. G10H 2210/021; G10H 1/368; G06F 3/165; G06F 3/04842; H04N 5/9305
  See application file for complete search history.

(56) References Cited

U.S. PATENT DOCUMENTS

| | | |
|---|---|---|
| 6,593,956 B1 | 7/2003 | Potts |
| 7,222,356 B1 | 5/2007 | Yonezawa |
| 7,301,092 B1 | 11/2007 | McNally |
| 7,483,618 B1 | 1/2009 | Edwards |
| 7,512,886 B1* | 3/2009 | Herberger ............. G11B 27/34 |
| | | 715/723 |
| 8,446,433 B1 | 5/2013 | Mallet |
| 8,611,422 B1 | 12/2013 | Yagnik |
| 8,718,447 B2 | 5/2014 | Yang |
| 8,730,299 B1 | 5/2014 | Kozko |
| 8,763,023 B1 | 6/2014 | Goetz |
| 8,910,046 B2 | 12/2014 | Matsuda |
| 8,988,509 B1 | 3/2015 | Macmillan |
| 9,032,299 B2 | 5/2015 | Lyons |
| 9,036,001 B2 | 5/2015 | Chuang |
| 9,077,956 B1 | 7/2015 | Morgan |
| 9,111,579 B2 | 8/2015 | Meaney |
| 9,142,253 B2 | 9/2015 | Ubillos |
| 9,151,933 B2 | 10/2015 | Sato |
| 9,204,039 B2 | 12/2015 | He |
| 9,208,821 B2 | 12/2015 | Evans |
| 9,245,582 B2 | 1/2016 | Shore |
| 9,253,533 B1 | 2/2016 | Morgan |
| 9,317,172 B2 | 4/2016 | Lyons |
| 9,423,944 B2 | 8/2016 | Eppolito |
| 9,473,758 B1 | 10/2016 | Long |
| 9,479,697 B2 | 10/2016 | Aguilar |
| 9,564,173 B2 | 2/2017 | Swenson |
| 9,977,643 B2 | 5/2018 | Lothian |
| 10,284,809 B1* | 5/2019 | Noel .................. H04N 5/9305 |
| 2004/0128317 A1 | 7/2004 | Sull |
| 2005/0025454 A1 | 2/2005 | Nakamura |
| 2006/0122842 A1 | 6/2006 | Herberger |
| 2007/0173296 A1 | 7/2007 | Hara |
| 2007/0204310 A1 | 8/2007 | Hua |
| 2007/0230461 A1 | 10/2007 | Singh |
| 2008/0044155 A1 | 2/2008 | Kuspa |
| 2008/0123976 A1 | 5/2008 | Coombs |
| 2008/0152297 A1 | 6/2008 | Ubillos |
| 2008/0163283 A1 | 7/2008 | Tan |
| 2008/0177706 A1 | 7/2008 | Yuen |
| 2008/0208791 A1 | 8/2008 | Das |
| 2008/0253735 A1 | 10/2008 | Kuspa |
| 2008/0313541 A1 | 12/2008 | Shafton |
| 2009/0213270 A1 | 8/2009 | Ismert |
| 2009/0274339 A9 | 11/2009 | Cohen |
| 2009/0327856 A1 | 12/2009 | Mouilleseaux |
| 2010/0045773 A1 | 2/2010 | Ritchey |
| 2010/0064219 A1 | 3/2010 | Gabrisko |
| 2010/0086216 A1 | 4/2010 | Lee |
| 2010/0104261 A1 | 4/2010 | Liu |
| 2010/0183280 A1 | 7/2010 | Beauregard |
| 2010/0231730 A1 | 9/2010 | Ichikawa |
| 2010/0245626 A1 | 9/2010 | Woycechowsky |
| 2010/0251295 A1 | 9/2010 | Amento |
| 2010/0278504 A1 | 11/2010 | Lyons |
| 2010/0278509 A1 | 11/2010 | Nagano |
| 2010/0281375 A1 | 11/2010 | Pendergast |
| 2010/0281386 A1 | 11/2010 | Lyons |
| 2010/0287476 A1 | 11/2010 | Sakai |
| 2010/0299630 A1 | 11/2010 | McCutchen |
| 2010/0318660 A1 | 12/2010 | Balsubramanian |
| 2010/0321471 A1 | 12/2010 | Casolara |
| 2011/0025847 A1 | 2/2011 | Park |
| 2011/0069148 A1 | 3/2011 | Jones |
| 2011/0069189 A1 | 3/2011 | Venkataraman |
| 2011/0075990 A1 | 3/2011 | Eyer |
| 2011/0093798 A1 | 4/2011 | Shahraray |
| 2011/0134240 A1 | 6/2011 | Anderson |
| 2011/0173565 A1 | 7/2011 | Ofek |
| 2011/0206351 A1 | 8/2011 | Givoly |
| 2011/0211040 A1 | 9/2011 | Lindemann |
| 2011/0258049 A1 | 10/2011 | Ramer |
| 2011/0293250 A1 | 12/2011 | Deever |
| 2011/0320322 A1 | 12/2011 | Roslak |
| 2012/0014673 A1 | 1/2012 | O'Dwyer |
| 2012/0027381 A1 | 2/2012 | Kataoka |
| 2012/0030029 A1 | 2/2012 | Flinn |
| 2012/0057852 A1 | 3/2012 | Devleeschouwer |
| 2012/0123780 A1 | 5/2012 | Gao |
| 2012/0127169 A1 | 5/2012 | Barcay |
| 2012/0206565 A1 | 8/2012 | Villmer |
| 2012/0311448 A1 | 12/2012 | Achour |
| 2013/0024805 A1 | 1/2013 | In |
| 2013/0044108 A1 | 2/2013 | Tanaka |
| 2013/0058532 A1 | 3/2013 | White |
| 2013/0063561 A1 | 3/2013 | Stephan |
| 2013/0078990 A1 | 3/2013 | Kim |
| 2013/0127636 A1 | 5/2013 | Aryanpur |
| 2013/0136193 A1 | 5/2013 | Hwang |
| 2013/0142384 A1 | 6/2013 | Ofek |
| 2013/0151970 A1 | 6/2013 | Achour |
| 2013/0166303 A1 | 6/2013 | Chang |
| 2013/0191743 A1 | 7/2013 | Reid |
| 2013/0195429 A1 | 8/2013 | Fay |
| 2013/0197967 A1 | 8/2013 | Pinto |
| 2013/0208134 A1 | 8/2013 | Hamalainen |
| 2013/0208942 A1 | 8/2013 | Davis |
| 2013/0215220 A1 | 8/2013 | Wang |
| 2013/0259399 A1 | 10/2013 | Ho |
| 2013/0263002 A1 | 10/2013 | Park |
| 2013/0283301 A1 | 10/2013 | Avedissian |
| 2013/0287214 A1 | 10/2013 | Resch |
| 2013/0287304 A1 | 10/2013 | Kimura |
| 2013/0300939 A1 | 11/2013 | Chou |
| 2013/0308921 A1 | 11/2013 | Budzinski |
| 2013/0318443 A1 | 11/2013 | Bachman |
| 2013/0343727 A1 | 12/2013 | Rav-Acha |
| 2014/0026156 A1 | 1/2014 | Deephanphongs |
| 2014/0064706 A1 | 3/2014 | Lewis, II |
| 2014/0072285 A1 | 3/2014 | Shynar |
| 2014/0093164 A1 | 4/2014 | Noorkami |
| 2014/0096002 A1 | 4/2014 | Dey |
| 2014/0105573 A1 | 4/2014 | Hanckmann |
| 2014/0161351 A1 | 6/2014 | Yagnik |
| 2014/0165119 A1 | 6/2014 | Liu |
| 2014/0169766 A1 | 6/2014 | Yu |
| 2014/0176542 A1 | 6/2014 | Shohara |
| 2014/0193040 A1 | 7/2014 | Bronshtein |
| 2014/0212107 A1 | 7/2014 | Saint-Jean |
| 2014/0219634 A1 | 8/2014 | McIntosh |
| 2014/0226953 A1 | 8/2014 | Hou |
| 2014/0232818 A1 | 8/2014 | Carr |
| 2014/0232819 A1 | 8/2014 | Armstrong |
| 2014/0245336 A1 | 8/2014 | Lewis, II |
| 2014/0300644 A1 | 10/2014 | Gillard |
| 2014/0328570 A1 | 11/2014 | Cheng |
| 2014/0341528 A1 | 11/2014 | Mahate |
| 2014/0366052 A1 | 12/2014 | Ives |
| 2014/0376876 A1 | 12/2014 | Bentley |
| 2015/0015680 A1 | 1/2015 | Wang |
| 2015/0022355 A1 | 1/2015 | Pham |
| 2015/0029089 A1 | 1/2015 | Kim |
| 2015/0058709 A1 | 2/2015 | Zaletel |
| 2015/0085111 A1 | 3/2015 | Lavery |
| 2015/0154452 A1 | 6/2015 | Bentley |
| 2015/0160916 A1* | 6/2015 | Lothian .................. G06F 3/165 |
| | | 715/719 |
| 2015/0178915 A1 | 6/2015 | Chatterjee |

(56) References Cited

U.S. PATENT DOCUMENTS

| | | |
|---|---|---|
| 2015/0186073 A1 | 7/2015 | Pacurariu |
| 2015/0220504 A1 | 8/2015 | Bocanegra Alvarez |
| 2015/0254871 A1 | 9/2015 | Timothy Macmillan |
| 2015/0256746 A1 | 9/2015 | Timothy Macmillan |
| 2015/0256808 A1 | 9/2015 | Timothy Macmillan |
| 2015/0271483 A1 | 9/2015 | Sun |
| 2015/0287435 A1 | 10/2015 | Land |
| 2015/0294141 A1 | 10/2015 | Molyneux |
| 2015/0318020 A1 | 11/2015 | Pribula |
| 2015/0339324 A1 | 11/2015 | Westmoreland |
| 2015/0375117 A1 | 12/2015 | Thompson |
| 2015/0382083 A1 | 12/2015 | Chen |
| 2016/0005435 A1 | 1/2016 | Campbell |
| 2016/0005440 A1 | 1/2016 | Gower |
| 2016/0026874 A1 | 1/2016 | Hodulik |
| 2016/0027470 A1 | 1/2016 | Newman |
| 2016/0027475 A1 | 1/2016 | Hodulik |
| 2016/0029105 A1 | 1/2016 | Newman |
| 2016/0055885 A1 | 2/2016 | Hodulik |
| 2016/0088287 A1 | 3/2016 | Sadi |
| 2016/0098941 A1 | 4/2016 | Kerluke |
| 2016/0119551 A1 | 4/2016 | Brown |
| 2016/0217325 A1 | 7/2016 | Bose |
| 2016/0225405 A1 | 8/2016 | Matias |
| 2016/0225410 A1 | 8/2016 | Lee |
| 2016/0234345 A1 | 8/2016 | Roberts |
| 2016/0358603 A1 | 12/2016 | Azam |
| 2016/0366330 A1 | 12/2016 | Boliek |
| 2017/0006214 A1 | 1/2017 | Andreassen |
| 2017/0092324 A1 | 3/2017 | Leonard |

OTHER PUBLICATIONS

Ricker, 'First Click: TomTom's Bandit camera beats GoPro with software' Mar. 9, 2016 URL: http://www.theverge.com/2016/3/9/11179298/tomtom-bandit-beats-gopro (6 pages).

PCT International Search Report and Written Opinion for PCT/US15/12086 dated Mar. 17, 2016, 7 pages.

Schroff et al., 'FaceNet: A Unified Embedding for Face Recognition and Clustering,' IEEE Conference on Computer Vision and Pattern Recognition (CVPR), 2016, 10 pgs.

Parkhi et al., 'Deep Face Recognition,' Proceedings of the British Machine Vision, 2015,12 pgs.

Iandola et al., 'SqueezeNet: AlexNet-level accuracy with 50x fewer parameters and <0.5MB model size', arXiv:1602.07360v3 [cs.CV] Apr. 6, 2016 (9 pgs.).

Ioffe et al., 'Batch Normalization: Accelerating Deep Network Training by Reducing Internal Covariate Shift,' arXiv:1502.03167, 2015, 11 pgs.

He et al., 'Deep Residual Learning for Image Recognition,' arXiv:1512.03385, 2015,12 pgs.

Han et al., Deep Compression: Compressing Deep Neural Networks with Pruning, Trained Quantization and Huffman Coding, International Conference on Learning Representations 2016, 14 pgs.

PCT International Search Report and Written Opinion for PCT/US16/31076, dated Aug. 8, 2016, 19 Pages.

Yang et al., 'Unsupervised Extraction of Video Highlights via Robust Recurrent Auto-encoders' arXiv:1510.01442v1 [cs.CV] Oct. 6, 2015 (9 pgs).

Tran et al., 'Learning Spatiotemporal Features with 3D Convolutional Networks', arXiv:1412.0767 [cs.CV] Dec. 2, 2014 (9 pgs).

PCT International Search Report for PCT/US15/41624 dated Nov. 4, 2015, 5 pages.

PCT International Search Report for PCT/US15/23680 dated Aug. 3, 2015, 4 pages.

PCT International Preliminary Report on Patentability for PCT/US2015/023680, dated Oct. 4, 2016, 10 pages.

FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.

FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA Vp a ck et. html>.

FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.

PCT International Search Report and Written Opinion for PCT/US15/18538, dated Jun. 16, 2015, 26 pages.

Ernoult, Emeric, 'How to Triple Your YouTube Video Views with Facebook', SocialMediaExaminer.com, Nov. 26, 2012, 16 pages.

PCT International Search Report for PCT/US17/16367 dated Apr. 14, 2017 (2 pages).

PCT International Search Reort for PCT/US15/18538 dated Jun. 16, 2015 (2 pages).

* cited by examiner

SYSTEMS AND METHODS FOR INTELLIGENTLY SYNCHRONIZING EVENTS IN VISUAL CONTENT WITH MUSICAL FEATURES IN AUDIO CONTENT

FIELD

The disclosure relates to systems and methods for intelligently synchronizing events in visual content with musical features in audio content.

BACKGROUND

Many computing platforms exist to enable users to create multimedia presentations by interleaving audio content (e.g., music) with visual content (e.g., photos, videos, etc.). Users of such computing platforms may wish to align particular events or transitions in the visual content with one or more musical features in the audio content. Conventional systems and methods for creating multimedia presentations do not provide intelligent alignment and/or synchronization of events in visual content and/or transitions between segments of visual content with musical features in audio content.

SUMMARY

The disclosure herein relates to synchronizing events or transitions in visual content with musical features in audio content. In instances where multiple segments of visual content are assembled for consecutive display in a single multimedia presentation, it may be desirable to align and/or synchronize transitions between segments of visual content with one or more musical features in the audio content. For example, for a given MP3 music file (exemplary digitized audio content), a user may wish to synchronize transitions between segments of visual content with parts, phrases, bars, hits, hooks, onbeats, beats, quavers, semiquavers, or any other musical features occurring within or otherwise associated with the digitized audio content. As used herein, the term "musical features" may include, without limitation, elements common to musical notations, elements common to transcriptions of music, elements relevant to the process of synchronizing a musical performance among multiple contributors, and/or other elements related to audio content. In some implementations, a part may include multiple phrases and/or bars. For example, a part in a commercial pop song may be an intro, a verse, a chorus, a bridge, a hook, a drop, and/or another major portion of the song. In some implementations, a phrase may include multiple beats. In some implementations, a phrase may span across multiple beats. In some implementations, a phrase may span across multiple beats without the beginning and ending of the phrase coinciding with beats. Musical features may be associated with a duration or length, e.g., measured in seconds.

In some implementations, the identification of one or more musical features includes the identification of a part using a Hidden Markov Model. In some implementations, the synchronization of visual content with audio content may use and/or be based on a Hidden Markov Model. By way of non-limiting example, the identification of one or more musical features may employ a Hidden Markov Model (HMM) to detect state changes in frequency measures that reflect one or more attributes about the represented audio content. An HMM may be designed to find, detect, and/or otherwise determine a sequence of hidden states from a sequence of observed states. In some implementations, a sequence of observed states may be a sequence of two or more (sound) frequency measures in a set of (subsequent and/or ordered) musical features, e.g., beats. In some implementations, a sequence of observed states may be a sequence of two or more (sound) frequency measures in a set of (subsequent and/or ordered) samples of the digital audio content information. In some implementations, a sequence of hidden states may be a sequence of two or more (musical) parts, phrases, and/or other musical features. For example, the HMM may be designed to detect and/or otherwise determine whether two or more subsequent beats include a transition from a first part (of a song) to a second part (of the song).

In some implementations, users may wish to align and/or synchronize events or transitions between segments of visual content with musical features in the audio content in accordance with a priority or hierarchy of those musical features. Such alignment and/or synchronization may include automatically adjusting durations of different portions of visual content (e.g., video content, photo content, text animations digital graphics, etc.) being combined and/or otherwise edited together in order to synchronize events (transitions in, occurrence of particular event, video effect, display change, lighting change, etc.) and/or transitions within the visual content with musical features present in audio content. This synchronization of visual content with musical features in audio content may enhance the perceived quality of a final presentation of the visual content and the audio content together. The synchronization may prioritize synchronizing the visual content to different types of musical features in the audio content differently (e.g., higher or lower priority musical features). The synchronization may be based on specified maximum durations, minimum durations, target durations, default durations, and/or other specified durations for the individual portions of the visual content.

In some implementations, systems of the present disclosure may include one or more physical computer processors configured by computer readable instructions to: obtain a first media file containing visual information representing first visual content; determine a minimum display duration, a maximum display duration, and/or a target display duration for display of the first visual content; obtain a first audio file containing audio information representing first audio content, the audio information including playback timing information for playback of the first audio content; determine a first playback-time in the first audio content to associate with a start-of-display-time for display of the first visual content; identify a first timeframe in the first audio content corresponding to a range of acceptable end-of-display-times for the first visual content, the range based on the start-of-display time, the minimum display duration, and/or the maximum display duration of the first visual content; identify multiple musical features within the first audio content during the first timeframe, wherein some musical features have higher priority and/or importance than other musical features based on a musical feature hierarchy; identify a first candidate musical feature from among the musical features identified based on its relative priority and/or importance as compared to the other musical features identified; and/or define a first candidate end-of-display time for the first visual content that aligns with the playback time of the first candidate musical feature. In some implementations, the identification of the first candidate musical feature from among the multiple musical features identified is further based on proximity in time of musical feature playback times to a target end-of-display time of the first visual content. In some implementations, one or more of the start-of-display time for the first visual content and/or the first playback-time in the first audio content may be adjustably defined by a user.

In some implementations, the system is further configured to obtain a second media file containing visual information representing second visual content; determine a minimum display duration, a maximum display duration, and/or a target display duration for display of the second visual content; determine a second playback-time in the first audio content to associate with a start-of-display-time for display of the second visual content; identify a second timeframe in the first audio content corresponding to a range of acceptable end-of-display-times for the second visual content, the range based on the start-of-display time, the minimum display duration, and/or the maximum display duration determined for the second visual content; identify multiple musical features within the first audio content during the second timeframe, wherein some musical features have higher priority and/or importance than other musical features based on a musical feature hierarchy; identify a second candidate musical feature from among the musical features identified based on its relative priority and/or importance as compared to the other musical features identified; define a second candidate end-of-display time for the second visual content that aligns with the playback time of the second candidate musical feature.

In some implementations, the first candidate musical feature playback time that corresponds to the first candidate end-of-display time of the first visual content also corresponds to a start-of-display-time of the second visual content. In some implementations, identification of the second timeframe in the first audio content is based, in part, on the playback time of the first candidate musical feature. In some implementations, the identification of a second candidate musical feature is further based upon the target display duration of the second visual content. In some implementations, the identification of a second candidate musical feature is further based upon proximity in time of musical feature playback times to the target end-of-display time of the second visual content. In some implementations, the identification of the first candidate musical feature from among the musical features identified in the first timeframe is further based on its relative proximity in time to a target end-of-display time of the first visual content as compared to the other musical features identified in the first timeframe, and the identification of the second candidate musical feature from among the musical features identified in the second timeframe is further based on its relative proximity in time to a target end-of-display time of the second visual content as compared to the other musical features identified in the second timeframe.

In some implementations, the first candidate musical feature and the second candidate musical feature are identified based on a combined measure of their proximity in time to the target end-of-display time of the first visual content and the target end-of-display time of the second visual content respectively. For example, in some implementations, the first candidate musical feature and the second candidate musical feature are identified such that the average of (i) the proximity in time between the playback time of the first candidate musical feature and the target-end of display time for the first visual content, and (ii) the proximity in time between the playback time of the second candidate musical feature and the target-end of display time for the second visual content advances or otherwise achieves a preference or desired outcome. For instance, the first candidate musical feature and the second musical feature may be identified such that the aforesaid average is reduced; and In some implementations, minimized. In other implementations, the first candidate musical feature and the second musical feature may be identified such that the aforesaid average is enlarged; and In some implementations, maximized.

One of ordinary skill in the art will appreciate that the technology described herein may be applied to any number of visual content combined and/or otherwise edited together. For instance, implementations of the present disclosure may further include a third visual content, a fourth visual content, and so on, and the same or similar determinations, identifications, definitions, etc. described herein are equally applicable to such additional visual content (e.g., identifying a third timeframe, a third candidate musical feature, a target end-of-display time for the third visual content, etc., and so on for any number of visual content). All such combinations and variations are intended to fall within the scope of the present disclosure and the claims associated herewith. Further, it should be understood that an average (i.e. mean) is just one example of a combined measure that may be used to identify a desirable combination or set of candidate musical features (e.g., for the first and second candidate musical features in the above example). Combined measures may include any one or more statistical measures, such as, e.g., median, sum, standard deviation, root-mean-squared, variance, and/or other types of aggregation, for example; any of which may form the basis for identifying one or more combinations or sets of candidate musical features that advances or otherwise achieves a preference or desired outcome.

In some implementations, the present disclosure provides a method for synchronizing transitions in visual content with musical features in audio content. The method may include the steps of obtaining a first media file containing visual information representing first visual content; determining a minimum display duration, a maximum display duration, and/or a target display duration for display of the first visual content; obtaining a first audio file containing audio information representing first audio content, the audio information including playback timing information for playback of the first audio content; determining a first playback-time in the first audio content to associate with a start-of-display-time for display of the first visual content; identifying a first timeframe in the first audio content corresponding to a range of acceptable end-of-display-times for the first visual content, the range based on the start-of-display time, the minimum display duration, and/or the maximum display duration of the first visual content; identifying multiple musical features within the first audio content during the first timeframe, wherein some musical features have higher priority and/or importance than other musical features based on a musical feature hierarchy; identifying a first candidate musical feature from among the musical features identified based on its relative priority and/or importance as compared to the other musical features identified; and/or defining a first candidate end-of-display time for the first visual content that aligns with the playback time of the first candidate musical feature.

In some implementations of the disclosed method, identification of the first candidate musical feature from among the multiple musical features identified is further based on proximity in time of musical feature playback times to a target end-of-display time of the first visual content. In some implementations of the disclosed method, one or more of the start-of-display time for the first visual content and/or the first playback-time in the first audio content may be adjustably defined by a user.

In some implementations of the disclosed method, the method further includes the steps of obtaining a second media file containing visual information representing second visual content; determining a minimum display duration, a maximum display duration, and/or a target display duration for display of the second visual content; determining a second playback-time in the first audio content to associate with a start-of-display-time for display of the second visual content; identifying a second timeframe in the first audio content corresponding to a range of acceptable end-of-display-times for the second visual content, the range based on the start-of-display time, the minimum display duration, and/or the maximum display duration determined for the second visual content; identifying multiple musical features within the first audio content during the second timeframe, wherein some musical features have higher priority and/or importance than other musical features based on a musical feature hierarchy; identifying a second candidate musical feature from among the musical features identified based on its relative priority and/or importance as compared to the other musical features identified; defining a second candidate end-of-display time for the second visual content that aligns with the playback time of the second candidate musical feature.

In some implementations, the first candidate musical feature playback time that corresponds to the first candidate end-of display time of the first visual content also corresponds to a start-of-display-time of the second visual content. In some implementations of the disclosed method, identification of the second timeframe in the first audio content is based, in part, on the playback time of the first candidate feature. In some implementations of the disclosed method, the second candidate musical feature is further based upon the target display duration of the second visual content. In some implementations of the disclosed method, the identification of a second candidate musical feature is further based upon its proximity in time to the target end-of-display time of the second visual content. In some implementations of the disclosed method, the identification of the first candidate musical feature from among the musical features identified in the first timeframe is further based on its relative proximity in time to a target end-of-display time of the first visual content as compared to the other musical features identified in the first timeframe, and the identification of the second candidate musical feature from among the musical features identified in the second timeframe is further based on its relative proximity in time to a target end-of-display time of the second visual content as compared to the other musical features identified in the second timeframe. In some implementations of the disclosed method, wherein start-of-display time for the first visual content is defined by a user.

In some implementations of the disclosed method, the first candidate musical feature and the second candidate musical feature are identified based on a combined measure of their proximity in time to the target end-of-display time of the first visual content and the target end-of-display time of the second visual content respectively. For example, in some implementations, the first candidate musical feature and the second candidate musical feature are identified such that the average of (i) the proximity in time between the playback time of the first candidate musical feature and the target-end of display time for the first visual content, and (ii) the proximity in time between the playback time of the second candidate musical feature and the target-end of display time for the second visual content advances or otherwise achieves a preference or desired outcome. For instance, the first candidate musical feature and the second musical feature may be identified such that the aforesaid average is reduced; and In some implementations, minimized. In other implementations, the first candidate musical feature and the second musical feature may be identified such that the aforesaid average is enlarged; and In some implementations, maximized.

One of ordinary skill in the art will appreciate that the technology and methods described herein may be applied to any number of visual content combined and/or otherwise edited together. For instance, implementations of the presently disclosed method may further include a third visual content, a fourth visual content, and so on, and the same or similar determinations, identifications, definitions, operations, etc. described herein are equally applicable to such additional visual content (e.g., identifying a third timeframe, a third candidate musical feature, a target end-of-display time for the third visual content, etc., and so on for any number of visual content). All such combinations and variations are intended to fall within the scope of the present disclosure and the claims associated herewith. Further, it should be understood that an average (i.e. mean) is just one example of a combined measure that may be used in operation for the identification of a desirable combination or set of candidate musical features (e.g., for the first and second candidate musical features in the above example). A combined measure may include any one or more statistical measures, such as, e.g., median, sum, standard deviation, root-mean-squared, variance, and/or other types of aggregation, for example; any of which may form the basis for identifying one or more combinations or sets of candidate musical features that advances or otherwise achieves a preference or desired outcome.

In some implementations, a system for synchronizing transitions in visual content with musical features in audio content is provided that includes one or more physical computer processors configured by computer readable instructions to: obtain a multiple media files containing visual information representing visual content; define a display order for the visual content of the multiple media files; define a minimum display duration, a maximum display duration, and/or a target display duration for display of the visual content of the multiple media files; obtain an audio file containing audio information representing audio content, the audio information including playback timing information for playback of the audio content; define a first playback-time in the audio content as a start-of-display-time for display of the visual content in accordance with the display order; identify one or more timeframes in the audio content playback corresponding to a range of acceptable end-of-display-times for individual visual content of the multiple visual content files, the range based on the start-of-display time, the minimum display duration, and/or the maximum display duration of the individual visual content of the multiple visual content files; identify multiple musical features within the one or more timeframes, wherein some musical features have higher importance than other musical features based on a musical feature hierarchy; identify a candidate musical feature within each timeframe based on its relative importance as compared to the other musical features identified; and/or define a candidate end-of-display time for individual visual content of the multiple visual content files, the candidate end-of-display time within each timeframe aligning with the playback time of the candidate musical feature within each timeframe.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

DETAILED DESCRIPTION

Figure 1:
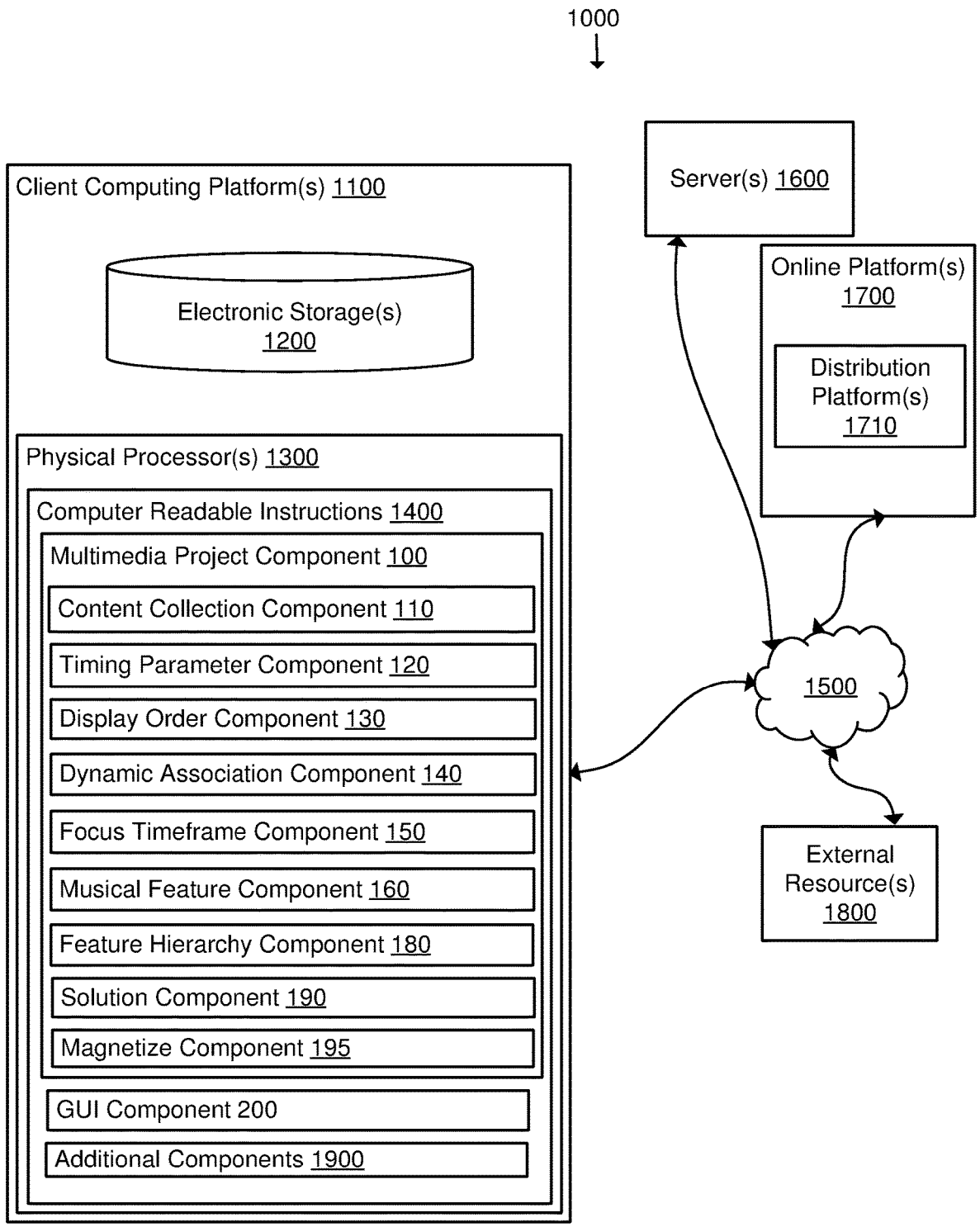
FIG. 1 illustrates an exemplary system for synchronizing transitions and/or events in visual content with musical features in audio content in accordance with one or more implementations of the present disclosure.

FIG. 1 illustrates an exemplary system for synchronizing events and/or transitions in visual content (including transitions between segments of visual content) with musical features in audio content in accordance with one or more implementations of the present disclosure. As shown, system 1000 may include one or more client computing platform(s) 1100, electronic storage(s) 1200, server(s) 1600, online platform(s) 1700, external resource(s) 1800, physical processor(s) 1300 configured to execute computer readable instructions 1400, computer program components 100-200, and/or other additional components.

Client computing platform(s) 1100 may include one or more of a cellular telephone, a smartphone, a digital camera, a laptop, a tablet computer, a desktop computer, a television set-top box, smart TV, a gaming console, and/or other computing platforms. Client computing platform(s) 1100 may embody or otherwise be operatively linked to electronic storage(s) 1200 (e.g., solid-state storage, hard disk drive storage, cloud storage, and/or ROM, etc.), server(s) 1600 (e.g., web servers, collaboration servers, mail servers, application servers, and/or other server platforms, etc.), online platform(s) 1700, and/or external resource(s) 1800. Online platform(s) 1700 may include one or more of a media platform or multimedia platform (e.g., Netflix, Hulu, iTunes, etc.), an audio platform (e.g., Pandora, Spotify, iTunes, Amazon Music), and/or other online platform (e.g., YouTube, Pinterest, Facebook, SnapChat, etc.). External resource(s) 1800 may include one or more of a broadcasting network, a station, and/or any other external resource that may be operatively coupled with one or more client computing platform(s) 1100, online platform(s) 1700, and/or server(s) 1800. In some implementations, external resource(s) 1800 may include other client computing platform(s) (e.g., other desktop computers in a distributed computing network), or peripherals such as speakers, microphones, or any other transducers or sensors.

Any one or more of client computing platform(s) 1100, electronic storage(s) 1200, server(s) 1600, online platform(s) 1700, and/or external resource(s) 1800—alone or in combination—may store, create, store, generate, identify, access, provide access, open, obtain, encode, decode, consume, or otherwise interact with one or more digital audio files (e.g., a digital music file) containing audio content information, one or more digital media files (e.g., digital video files, digital photo files, etc.) containing visual content information, and/or the audio or visual content information contained within the files. The audio files and/or media files may be in any format, including any container, wrapper, or metafile format known in the art. The information contained in the files (i.e. the numeric code representing the digitized audio or visual content) may be in any coding format, including any compression format or encoding format known in the art. Any one or more of the foregoing elements depicted in FIG. 1—alone or in combination—may include or be operatively coupled with one or more software or hardware audio codecs configured to compress and/or decompress digital audio, media, and/or multimedia content information, and/or encode analog audio as digital signals and/or convert digital signals back into audio in accordance with any one or more audio coding formats.

As depicted in FIG. 1, physical processor(s) 1300 may be configured to execute computer readable instructions 1400. As one of ordinary skill in the art will appreciate, such machine-readable instructions may be stored in a memory (not shown), and be made accessible to the physical processor(s) 1300 for execution in any manner, including any manner known in the art. When executed, computer readable instructions 1400 may cause the one or more physical processor(s) 1300 to effectuate access to, analysis of, and/or manipulation of any audio, media, and/or multimedia content information and/or to effectuate synchronization of transitions or other events in visual content with candidate (e.g., the most significant) musical features in audio content. Other features of the present technology may be effectuated by execution of computer readable instructions 1400 as described in more detail herein (e.g., symbolic graphical display of audio/visual content information, user interactivity, editing, and selection tools, etc.). As shown, computer readable instructions 1400 of system 1000 may include one or more computer program components such as Multimedia Project Component 100, Content Collection Component 110, Duration Range Component 130, Display Order Component 130, Dynamic Association Component 140, Focus Timeframe Component 150, Musical Feature Component 160, Feature Hierarchy Component 180, Solution Component 190, Magnetize Component 195, GUI Component 200, and/or any one or more additional components 1900.

Multimedia Project Component 100, alone or in combination with any other component or element described herein, may be configured to define, arrange, organize and/or prepare a multimedia presentation by combining individual segments of visual content with audio content (or one or more segments of audio content) in a manner that snaps events in (or transitions between) individual segments of visual content with/to musical features in the audio content according to a priority (e.g., a rank or hierarchy among different types or combinations of musical features in audio content, or a rank or hierarchy among different events in visual content). A "segment" for purposes of this disclosure may refer to all or a portion of individual audio content (e.g., from an audio file and/or other sources) and/or individual visual content (e.g., from a media file, an image file, a video file, and/or other sources)—the content being defined by information/data contained within one or more files. A portion may refer to a time based portion (e.g., the first minute of a three minute video and/or other time based portions), or a content based portion (e.g., a particular scene in a video, a particular region/crop of a photo, a set of frames in a video, and/or other content based portions). Multimedia Project Component 100 may effectuate the features of the present disclosure by receiving input from a user, by executing an operation in accordance with predefined preferences or parameters, by operation or communication with of any one or more of the components (or subcomponents) or elements described herein. For example, in accordance with one or more implementations of the present disclosure, Multimedia Project Component 100 may define, organize, and/or prepare a multimedia content presentation (e.g., preparing a file containing multimedia content, defining information that may be contained within a file that represents an intelligent combination of audio content with visual content, etc.) by engaging one or more of Content Collection Component 110, Duration Range Component 130, Display Order Component 130, Dynamic Association Component 140, Focus Timeframe Component 150, Musical Feature Component 160, Feature Hierarchy Component 180, Solution Component 190, and/or Magnetize Component 195.

Content Collection Component 110 may be configured to obtain a subset of visual content and audio content from which a multimedia presentation may be defined, created, or generated. Obtaining the subset of visual content and audio content may include one or more of gathering, collecting, retrieving, receiving, storing, accessing, downloading, providing access to, opening, consuming, decoding, and/or otherwise collecting and/or obtaining the visual content and/or the audio content (or information representing the visual content and/or the audio content) in other ways. Content Collection Component 110 may obtain the subset based on a selection of one or more media files and/or one or more audio files (or information contained therein). Content Collection Component 110 may effectuate selection in any manner, including by receiving input from a user, by operation of an algorithm, in accordance with one or more predefined preferences or parameters, or by any combination of the foregoing.

For example, Content Collection Component 110 may provide a selection tool to a user via a graphical user interface, wherein a user may browse different storage locations where audio content and/or visual content files may be located, and obtain the same for inclusion in the multimedia presentation. Obtaining the visual content may involve one or more of gathering, collecting, retrieving, receiving, storing, accessing, downloading, providing access to, opening, consuming, decoding, and/or otherwise collecting the visual content, e.g., upon selection by a user. For instance, a user building a multimedia presentation may select two photos (two visual content files) from their laptop hard drive (from electronic storage 1200 on their client computing platform 1100), one video clip (one visual content file) from YouTube (from Online Platform 1700), and one song (one audio content file) from a flash drive (external resource 1800) they plugged into their laptop computer to include in the multimedia presentation. Upon the user's selection, Content Collection Component 110 may obtain the respective files (e.g., the two photo files, the one video file, and the one music file) in any manner, e.g., copying, moving, downloading, capturing, etc.

In another example, Content Collection Component 110 may automatically collect the visual content and/or audio content based on a predetermined criteria such as timing and/or location. For instance, Content Collection Component 110 may automatically collect visual content captured during a particular timeframe in a particular location for a particular user. That is, Content Collection Component 110 may recognize a grouping of photo files within a user's photo database that have geolocation information indicating the pictures were taken in Paris, France throughout a one week period, unlike all the remaining photos in the user's photo database which were taken in the United States. Content Collection Component 110 may determine that all the photos taken in France may be associated with a user's visit to France, and thereby collect some or all such related visual content for inclusion in a particular multimedia presentation. Content Collection Component 110 may also identify an audio file on the user's smartphone that the user selected for playback most frequently during the time period when the user was in France, and obtain or download the audio file for inclusion in the multimedia presentation. One of ordinary skill in the art will appreciate that any preference, criteria, or predefined operation for identifying and selecting and/or collecting, obtaining, downloading, loading, or gathering visual content and audio content for inclusion in a multimedia presentation may be employed without departing from the scope of the present disclosure.

Timing Parameter Component 120 may be configured to obtain, identify, determine and/or define timing information for playback of audio content and/or display of visual content for the multimedia presentation. Timing Parameter Component 120 may be configured to identify, obtain, determine and/or define a start-of-playback time, end-of-playback time, and/or a playback duration of audio content for use in the multimedia presentation. For example, Timing Parameter Component 120 may determine that a song, Song N, loaded into the project by Content Collection Component 110 has a duration of 02:00 minutes, with a default start-of-playback time at 0:00 and an end-of-playback time at 2:00 (i.e. two minutes) by default. Thus, by default the 0:00 start-of-playback of Song N may denote or define the start-of-presentation (0:00) of the multimedia presentation. Timing Parameter Component 120 may keep this default timing information, or may permit a user to modify/adjust it based on user preference. For instance, Timing Parameter Component 120 may provide an adjustment tool (e.g., a slide bar, an input field, etc.) to a user via a graphical user interface, wherein a user may adjust, select, or otherwise provide a start-of-playback time and/or end-of-playback time for the audio content of the given audio content file with respect to the multimedia presentation. For example, a user may adjust or specify that the start-of-playback time for Song N is 00:15 instead of 0:00 and end-of-playback time is 1:15 instead of 2:00. Thus, the start-of-presentation of the multimedia project may align/correspond with start-of-playback time 0:15 of Song N, and end-of-presentation of the multimedia project may align/correspond with end-of-playback time 01:15 of audio content.

Timing Parameter Component 120 may be configured to define a display duration range of visual content for use in the multimedia presentation. Defining a duration range may include obtaining, accessing, retrieving, identifying or otherwise determining duration range information and/or parameters in any manner, and/or defining the duration range in any other way. A display duration range may include a minimum duration time, a maximum duration time, and/or a target duration time for display or presentation of visual content within the multimedia presentation. The duration range parameters may be defined based on the content type or subtype, a predefined criteria or preference, a user preference, user input or other input (e.g., user input), events or features within the content, and/or timing information already embedded within the content.

For example, Content Collection Component 110 may obtain three media files—two photo files and one video file. Timing Parameter Component 120 may define a duration range to the two photo files based on one or more predefined rules, and define a duration range to the one video file based on the timing information contained in the video file. For instance, Timing Parameter Component 120 may recognize that the photo files are simply image content with no embedded timing information, and by default assign each of them a minimum display time of two seconds, a maximum display time of six seconds, and a target display time of four seconds (e.g., for display of the image content, or a portion of the image content, within each photo file). Further, Timing Parameter Component 120 may recognize that the video file includes timing information indicating a video content display duration of sixty seconds. Based on the identified video playback duration time of one minute, Timing Parameter Component 120 may assign a minimum duration time of 50 seconds, a maximum duration time of 60 seconds, and a target duration time of 55 seconds. It should be noted that the duration range may be as wide or narrow as desired. Moreover, it should be noted that Timing Parameter Component 120 may be configured to divide a video segment that exceeds a predefined length of time or predefined amount of data into multiple smaller segments having a shorter length of time or smaller amount of data.

In some implementations, Timing Parameter Component 120 may set or define the minimum, maximum, and/or target duration times for visual content based on an identified event within the visual content (and identification of such an event may be aided or unaided by a user's selection). For example, Timing Parameter Component 120 may be configured to identify events occurring within the video file, and set the target duration time (and/or the maximum and minimum duration times) based on one or more such significant events. For instance, Timing Parameter Component 120 may identify, based on the information contained in the video file, that each frame associated with a playback time after thirty-six seconds is null (e.g., little to no photons detected from the capture device that recorded the video, i.e., empty/black frames). Thus, Timing Parameter Component 120 may predict that, although the video includes a duration of sixty seconds, the video content of interest ended after second thirty-six. Accordingly, Timing Parameter Component 120 may assign a target duration time of thirty-five seconds, a minimum duration time of thirty-four seconds, and a maximum duration time of thirty-six seconds.

In another example, Timing Parameter Component 120 may detect a significant event in a video file, e.g., such as a segment or moment(s) in a video file where coincident audio from the video recording becomes very loud and is indicative of a cheering crowd. The detected cheering may begin at second twenty-six, end at second thirty-two, with a loudest moment at second twenty-seven (indicating the occurrence of a significant event in the video content). Timing Parameter Component 120 may be configured to recognize such moment(s) or segments and/or the associated timing information, and set the minimum duration time, maximum duration time, and target duration time for the visual content accordingly. Here, for example, the duration range may be set to mirror the timing of the detected event, for example, target display time may be twenty-seven seconds, minimum display time may be set to twenty-six seconds, and maximum display time of thirty-two seconds (e.g., minimum end-of-display time=00:26; target end-of-display time=00:27; maximum end-of-display time=00:32). In other examples, the duration range may not exactly track the timing of the detected event (as just described), but may instead be based on the timing of the detected event in other ways. For instance, Timing Parameter Component 120 may set the minimum duration to twenty-seven seconds (the loudest moment in the above example) to ensure that more of the visual content following the significant event are captured. In some implementations, Timing Parameter Component 120 may set the duration range based on the timing of the detected event. For example, Timing Parameter Component 120 may set the minimum duration (and/or maximum duration) in accordance with a predetermined time prior to a detected event (or moment within the event). For example, one second before the peak cheering detected in the above example (minimum end-of-display time=00:26). It should be noted that the end-of-display time for a given video (or other media to be presented) may occur simultaneously with or just prior to the start-of-display time of a subsequent video (or other media) to be presented.

In some implementations, Timing Parameter Component 120 may be configured to set or define the minimum, maximum, and/or target duration times for visual content based on input from a user. For example, Timing Parameter Component 120 may provide one or more duration range tool(s) to a user via a graphical user interface, wherein a user may enter, select, adjust, or otherwise provide input defining the minimum, maximum, and/or target duration times for certain visual content. In some implementations, the user may provide input defining the minimum, maximum, and/or target duration times for each visual content segment to be included within a given multimedia project. For instance, the user may wish to develop a multimedia project from twenty-five photos that they took on a recent trip. After the photo files are collected by Content Collection Component 110, Timing Parameter Component 120 may effectuate user definition of duration information (e.g., by prompting a user to enter or provide such information). For example, the user may define, via Timing Parameter Component 120, minimum/target/maximum duration times of 5/7/10 seconds for one of the photos, and minimum/target/maximum duration times of 1/2/3 for the remaining 24 photos. One of ordinary skill in the art will appreciate that Timing Parameter Component 120 may be configured to enable a user may define duration and/or other timing information for visual content and/or audio content in any manner.

In some implementations, Timing Parameter Component 120 may be configured to set or define longer minimum/target/maximum duration times to a particular item of visual content based on the occurrence of multiple similar items of visual content. In other words, if a user took 10 similar pictures during a trip, the selected subset of those 10 pictures (e.g. 1 or 2 representative pictures) may be associated with longer minimum/target/maximum duration times than other pictures from the same trip. The number of similar pictures taken may represent a relative importance to the user, and Timing Parameter Component 120 may be configured to set or define minimum/target/maximum duration times based at least in part on such a relative importance to the user.

In some implementations, e.g., where Timing Parameter Component 120 is configured to receive input from a user to define the minimum, maximum, and/or target duration times for certain visual content, Timing Parameter Component 120 may impose limitations on the duration range definitions in accordance with one or more local constraints (i.e., constraints specific to particular visual content) or global constraints (i.e., constraints that may apply to the multimedia project as a whole), and/or prompt a user when the user's input would lead to a duration range parameter that violates such constraint(s) (e.g., exceeds a predetermined limitation).

For instance, Timing Parameter Component 120 may recognize that the audio content for the multimedia project has a total length of 1:00 minute. Accordingly, where a user provides input regarding the duration range (e.g., minimum, maximum, and/or target duration) for a visual content segment that, alone or in combination with the duration range parameters of the other visual content segments of the multimedia project would exceed 1:00 minute, Timing Parameter Component 120 may recognize a conflict between the user input and a local or global constraint, and prompt the user that the operation or definition is not allowed, and/or should be adjusted.

In some implementations, the Timing Parameter Component 120 may provide the user with one or more suggested duration parameter definitions satisfying the constraints, or one or more other options the user might select to satisfy the constraints (e.g., suggest that the user remove one or more video clips or other visual content segments from the multimedia presentation, suggest that the user add additional audio content to be stitched to the end of the first audio content to lengthen the multimedia presentation, and/or suggest that the user redefine another visual content segments duration range parameters, and/or any other suggestions or prompts). Timing Parameter Component 120 may be configured to provide feedback (i.e. prompts or other suggestions) to a user via a GUI operatively coupled therewith. Accordingly, Timing Parameter Component 120 may govern the upper and lower limits for the duration range definitions for visual content in accordance with one or more local or global constraints.

In some implementations, Timing Parameter Component 120 may be configured to effectuate and/or permit a user to make slip edits to visual content. For example, if Content Collection Component 110 has obtained a video clip, Timing Parameter Component 120 may enable a user to perform a slip edit to the video clip to define what portion of the video clip will be used in the multimedia presentation. A slip edit feature in accordance with the present technology may allow a user to make an adjustment of which segment or portion of a video clip (i.e. visual content) will be provided for display in the multimedia project. In some implementations, slip edits may be made any time throughout the creation of the multimedia presentation, and any one or more of the components and/or operations described herein may be iteratively, dynamically, automatically, and/or adjustably updated in accordance with such edits.

Display Order Component 130 may be configured to define a display order of the collected visual content for the multimedia presentation. Defining a display order may include determining, obtaining, identifying, establishing, receiving, and/or creating a display order of/for the collected visual content. Display Order Component 130 may define a display order for the collected visual content in any manner, including in accordance with a user input, based on a predefined preference or criteria, based on a priority, and/or based upon information within one or more of the files containing visual content.

For example, if three media files containing visual content are collected for inclusion in the multimedia project, two photo files and one video file—namely Photo A file, Photo B file, and Video V file—Display Order Component 130 may be configured to receive input from a user regarding the display order of the visual content contained within each file. For example, the user may select Photo B to be displayed first, Video V second, and Photo A last (e.g., by selection options provided by Display Order Component 130 via a GUI in operative communication therewith).

In some implementations, Display Order Component 130 may be configured to automatically define a display order for the visual content based on a predefined preference and/or information from the content file. For example, Display Order Component 130 may define an order for the visual content in accordance with a predetermined preference that first in capture time comes first in display time (i.e. a chronological order). In such an instance, Display Order Component 130 may arrange the content of the three files in chronological order based on when the visual content was recorded/captured. So if Video V was taken before photo B but after photo A, the display order defined or established by Display Order Component 130 may be Photo A, then Video V, then Photo B. One of skill in the art will appreciate that the display order defined or proposed by Display Order Component 130 can be effectuated based on any criteria, preference, or priority, regardless of complexity.

In some implementations, Display Order Component 130 may be configured to effectuate a change in the display order of content items, and/or effectuate the addition of and/or elimination of visual content from the multimedia presentation. Display Order Component 130 may be configured, e.g., to receive input from a user at any time which (i) changes the order of the visual content to be displayed in the multimedia presentation, (ii) removes visual content, or a portion of a visual content segment, from inclusion in the multimedia presentation, and/or (iii) adds visual content, or a portion of a visual content segment, into the project for inclusion in the multimedia presentation, etc.

Dynamic Association Component 140 may be configured to dynamically associate all or a portion of the collected visual content with one or more time segments of the collected audio content. Such dynamic association may include iteratively, periodically, temporarily, adaptably, momentarily, and/or adjustably associating the visual content with the one or more time segments of the collected audio content. In some implementations, the association is based on the timing and/or duration parameters obtained, defined or set via Timing Parameter Component 120 and/or the display order of the visual content defined via Display Order Component 130.

For example, if Content Collection Component 110 obtained three media files having visual content for display (namely, Photo A file, Photo B file, and Video V file), and one audio file having music for playback (namely, Song S), Timing Parameter Component 120 may: (i) determine that the content included in the Song S file has an original playback duration of sixty seconds (with a default start-of-display time of 0:00), and (ii) define minimum/target/maximum display duration times of 2/4/6 seconds for Photo A, 2/4/6 seconds for photo B, and 34/35/36 seconds for Video V, and Display Order Component 130 may establish a display order as: photo A, video V, photo B for the multimedia project, and Dynamic Association Component 140 may dynamically associate Photo A content with a first time segment of Song S, Video V content with a second time segment of Song S, and Photo B with a third time segment of Song S in a representative manner (e.g., representing the association symbolically on a graphical user interface).

In some implementations, as visual content may be dynamically associated with display duration ranges defined by Timing Parameter Component 120, the time segment of audio content to which one portion of visual content is dynamically associated may overlap with the time segment dynamically associated with another portion of visual content. For instance, extending the example above, the first time segment associated with Photo A may overlap to some degree with the second time segment associated with Video V, and likewise the second time segment associated with Video V may overlap to some degree with third time segment associated with Photo B. One of ordinary skill in the art will appreciate that the minimum, target, and maximum duration times associated with visual content may be utilized to define or otherwise identify the range of acceptable end-of-display times within the multimedia presentation for each item of visual content. Determinations of such acceptable end-of display times for individual visual content items may be based, in whole or in part, upon predetermined or projected start-of presentation timing, start-of-display timing, and/or start-of-playback timing for one or more individual visual content items and/or audio content items.

For example, Photo A may be dynamically associated with playback time 0:00 to 0:06 of the Song S, i.e., aligning start-of-display time of Photo A with start-of-playback time of Song S for the multimedia presentation, and extending to a Song S playback time that aligns with the maximum display duration for photo A (denoting the maximum acceptable end-of-display time for Photo A); Video V may be dynamically associated with playback time 0:04 to 0:40 of song S, i.e., aligning start-of-display time of Video V with the song S playback time that aligns with the target display duration of Photo A, and extending to a Song S playback time that aligns with the maximum display duration for Video V (denoting the maximum acceptable end-of-display time for Video V, given the projected start-of-display time keyed to Photo A's target end-of display time based on Photo A's target display duration); and Photo B may be dynamically associated with time 0:39 to 0:45 of song S (e.g., aligning start-of-display time of Photo B with the playback time of song S that aligns with the target display duration of Video V, and extending to the Song S playback time that aligns with the maximum display duration for photo B (denoting the maximum acceptable end-of-display time for Photo B, given a projected start-of-display time keyed to Video V's target end-of display time based on Video V's target display duration). As may be observed, the time segments dynamically associated with visual content may overlap to some extent. The amount of overlap may change as other parameters are adjusted. For example, if the user provides input that causes the display order to change, or the duration range for a given visual content to be modified, etc. It should be understood that Dynamic Association Component 140 may be configured to automatically make adjustments in associations of visual content with the time segments of the audio content based on any and all such adjustments made throughout the creation of the multimedia project.

Focus Timeframe Component 150 may be configured to identify and/or determine an audio playback timeframe that corresponds a range of playback times to which an event in or transition between visual content of the multimedia project may be acceptably aligned. Focus Timeframe Component 150 may identify and/or determine focus playback timeframe(s) by identifying time segments of the audio content associated with duration range parameters of visual content (i.e., time segments that correspond to the minimum/target/maximum display duration times of the visual content, as dynamically associated with the audio content by Dynamic Association Component 140).

For instance, extending the example above—where Photo A is dynamically associated with playback time 0:00 to 0:06 of Song S (which is 0:60 seconds in length), Video V is dynamically associated with playback times 0:04 to 0:40 of Song S, and Photo B is dynamically associated with playback times 0:39 to 0:45 of Song S; and further where minimum/target/maximum duration times (corresponding to end-of-display times) are 2/4/6 seconds for both Photo A and Photo B, and 34/35/36 seconds for the Video V—Focus Timeframe Component 150 may identify three focus playback timeframes of interest based on the three display transitions associated with the visual content. For example, given a user selected or default/preference based alignment of start-of-display time of photo A with the start-of-playback time of 0:00 for song S, for instance, first focus playback timeframe may include the 0:02 to 0:06 window of audio playback times (corresponding to the 2/4/6 second duration range parameters for Photo A). Given a user selected or default/preference based alignment of the projected start-of-display time of Video V with target end-of-display time of Photo A, for instance, second focus playback timeframe may include the 0:38-0:40 window of playback times (corresponding to the 34/35/36 second duration range parameters for Video V). Given a user selected or default/preference based alignment of the projected start-of-display time of Photo B with target end-of-display time of Video V, for instance, third focus playback timeframe may include the 0:41-0:45 window of playback times (corresponding to the 2/4/6 second duration range parameters for Photo B). Any one or more of the foregoing may be dynamically changed upon adjustments made via user input, or as individual target-end-of display times are identified, determined, and/or finalized.

Although in the foregoing examples, the start-of-display time for the first visual content (photo A) is keyed to the encoded start-of-playback time contained within the song information itself (default start time of Song S), it should be noted that this start-of-playback time may be adjusted, modified, or otherwise defined as a different time within the audio content as well. For instance, system 1000 may receive input from a user designating that the start-of-playback time for the multimedia project should correspond to time 0:05 instead of 0:00 of the audio content (e.g., of song S), thereby shifting all downstream time segment associations by five seconds. One of ordinary skill in the art will appreciate that the start-of-playback time may be designated and/or defined in any manner, including based upon user input, a predefined preference or criteria, a priority, an event in visual content, a musical feature in the audio content, and/or in other ways. As user input or new information is obtained by system 1000, any one or more of the foregoing parameters or definitions may be dynamically updated, refreshed, recalculated, or changed.

By way of non-limiting example, system 1000 may be configured to determine a set of minimum/target/maximum display duration times corresponding to a set of items of visual content (e.g., a set of photographs) without regard for any musical features in a particular item of audio content (i.e., a song). Solutions for a determined set of minimum/target/maximum display duration times may be assigned a rating and/or score based on how close (in time) one or more individual display duration times are to the corresponding target display duration times. Alternatively, and/or simultaneously, ratings and/or scores may be based, at least in part, on additional constraints, including but not limited to a solution matching a target total display time (such as, e.g., the total playing time of the particular item of audio content). One or more of these solutions may be used as a reference for determining the relative quality and/or suitability of subsequently determined solutions that have additional constraints. For example, different solutions in which the transitions between adjacent items of visual content are synchronized to particular musical features, as described in this disclosure, may be ordered and/or ranked according to a comparison with a reference solution. In some implementations, different solutions in which the transitions between adjacent items of visual content are synchronized to particular musical features may be ordered and/or ranked according to how close (in time) the individual display duration times of a set of items of visual content are to the corresponding target display duration times of the set of items of visual content.

Musical Feature Component 160 may be configured to identify one or more musical features in audio content, e.g. one or more musical features falling within one or more particular timeframes, including but not limited to focus playback timeframe(s). Identifying musical features may include detecting, determine, perceiving, obtaining, and/or recognizing the one or more musical features of the audio content. Musical Feature Component 160 may effectuate such identification or determination of the one or more musical features within a focus playback timeframe in any manner, including by receiving input from a user identifying the features, or by obtaining, identifying, and/or assessing sound frequencies represented in the audio content information (described in more detail with reference to FIGS. 4-5).

For example, Musical Feature Component 160 may in some instances be configured to receive an identification of one or more musical features within audio content associated one or more focus playback timeframe(s). Musical Feature Component 160 may receive input from a user (via a selection/definition tool of a user interface) whereby the user identifies musical features within a focus playback timeframe, or identifies playback times associated with significant musical features they are aware of. Musical features identified by or via Musical Feature Component 160 may include any one or more parts (or part changes), phrases, bars, hits, hooks, onbeats, beats, quavers, semiquavers, or any other musical features occurring within or otherwise associated with audio content. For example, a part in a commercial pop song may be an intro, a verse, a chorus, a bridge, a hook, a drop, and/or another major portion of a song. In some implementations, Musical Feature Component 160 may identify or determine additional musical features based on earlier identified musical features. For example, in some implementations, Musical Feature Component 160 may obtain beat information (including timing information of when beats occur) throughout a song through operation of an algorithm, identify part information (including timing information of when parts occur) throughout a song by seeking out and identifying state changes based on a Hidden Markov Model, and then utilize one or more of the foregoing beat and part information about the song to identify additional musical features.

In some implementations, one or more components and/or features of the system disclosed herein may operate as system 1000, characteristic identification component 1430, and/or musical feature component 1440 described in U.S. patent application Ser. No. 15/436,370 filed Feb. 17, 2017, and entitled "SYSTEMS AND METHODS FOR DETECTING MUSICAL FEATURES IN AUDIO CONTENT," which is incorporated herein by reference in its entirety, and which is referred to in this disclosure as "the Musical Feature Application". In some implementations, Musical Feature Component 160 may operate as "system 1000", "characteristic identification component 1430", and/or "musical feature component 1440" described in the Musical Feature Application. By way of non-limiting example, the identification of one or more musical features may employ a Hidden Markov Model (HMM) to detect state changes in frequency measures that reflect one or more attributes about the represented audio content. For example, the HMM may be designed to detect and/or otherwise determine whether two or more subsequent beats include a transition from a first part (of a song) to a second part (of the song).

Feature Hierarchy Component 170 may be configured to obtain a hierarchy or priority among different types and/or combinations of musical features present in audio content, and/or to identify where in the hierarchy the musical features identified/obtained by Musical Feature Component 160 fall. Obtaining a hierarchy or priority among different types and/or combinations of musical features may include defining, creating, identifying, determining, or otherwise identifying a hierarchy or priority. Feature Hierarchy Component 170 may effectuate the foregoing in any manner, including by receiving input from a user defining a hierarchy among musical features, obtaining a predefined hierarchy from another source in operative communication with Feature Hierarchy Component 170, defining or establishing the hierarchy in accordance with a preference, a priority, a rule, a condition, or other criteria. In some implementations, Musical Feature Component 160 may rank the musical features identified for each focus timeframe in accordance with a priority, hierarchy, or other ranking scheme. An exemplary musical feature hierarchy is represented in Table 1 below.

TABLE 1

Feature Hierarchy

| Rank | Feature |
| --- | --- |
| 1 (highest) | Start/end of the audio content |
| 2 | Part |
| 3 | Phrase |
| 4 | Hit |
| 5 | Bar |
| 6 | OnBeat |
| 7 | Beat |
| 8 | Quaver |
| 9 (lowest) | SemiQuaver |

As shown in Table 1, an exemplary musical feature hierarchy may include a relative ranking for individual musical feature types. As shown, a part (or part change) ranks higher than a phrase, which ranks higher than a hit, which ranks higher than a bar, and so on. Any ranking hierarchy may be employed. It should also be noted that musical feature hierarchy may include a ranking among musical features of the same type (e.g., some bars may be given a higher priority than other bars (based on user preferences and/or other criteria), etc.). In another example, musical feature hierarchy may include ranking information for one or more combinations of musical features as compared to other combinations of musical features and/or than other individual musical features. Such a hierarchy may be useful for determining the ranking associated with a certain playback time in the audio playback when multiple musical features occur simultaneously (or nearly simultaneously). For example, such an exemplary musical feature hierarchy is represented in Table 2 below.

TABLE 2

Feature Hierarchy

| Rank | Feature |
|---|---|
| 1 (highest) | Part Change + Phrase + Bar + Hit + Onbeat |
| 2 | Part Change + Phrase + Bar + Hit + Beat |
| 3 | Part Change + Phrase + Bar + Hit |
| 4 | Part Change + Phrase + Bar |
| 5 | Part Change |
| 6 | Phrase + Bar + Hit + Onbeat + Quaver |
| 7 | Phrase + Bar + Onbeat + Quaver |
| 8 | Phrase + Bar + Onbeat |
| 9 | Phrase |
| 10 | Hit |
| 11 | Bar + Hit + Onbeat + Quaver |
| 12 | Bar + Onbeat + Quaver |
| 13 | Bar + Onbeat |
| 14 | OnBeat |
| 14 | Quaver |
| 15 (lowest) | SemiQuaver |

As shown above in Table 2, musical feature hierarchy may include ranking information for one or more combinations of musical features as compared to other combinations of musical features and/or than other individual musical features. As further shown in Table 2, in some instances two or more features or feature combinations may have the same rank or placement in the hierarchy (e.g., both Onbeats and Quavers alone are ranked fourteenth). That is, there may be a "tie" in the significance of two different musical features or musical feature combinations. In another example, musical feature hierarchy may include one or more predefined preferences, priority rules, conditions, or other criteria that form the basis of establishing or defining a hierarchy of musical features within a particular focus playback timeframe. For example, such an exemplary musical feature hierarchy priority rule/condition set is represented in Table 3 below.

TABLE 3

Feature Hierarchy

| Rank | Feature Condition |
|---|---|
| 1 (highest) | A Part Change occurring at the same time as 3 or more other features of any type |
| 2 | A Part Change occurring at the same time as 2 other features of any type |
| 3 | A Part Change occurring at the same time as 1 other features of any type |
| 4 | A Part Change occurring alone |
| 5 | A Phrase occurring at the same time as 3 or more other features of any type |
| 6 | A Phrase occurring at the same time as 2 other features of any type |
| 7 | A Phrase occurring at the same time as 1 other features of any type |
| 8 | A Phrase occurring alone |
| 9 | A Hit occurring at the same time as 3 or more other features of any type |
| 10 | A Hit occurring at the same time as 2 other features of any type |
| 11 | . . . |

One of ordinary skill in the art will appreciate that the above examples are not exhaustive, and that Feature Hierarchy Component 170 may operate in any manner to define or otherwise establish a musical feature hierarchy and/or ranking scheme—including by receiving input from a user defining a hierarchy among musical features, obtaining a predefined hierarchy from another source in operative communication with Feature Hierarchy Component 170, and/or defining or establishing the hierarchy in accordance with a preference or priority rule/condition, etc.

Solution Component 190 may be configured to identify or determine a candidate moment within a focus playback timeframe to which the end-of-display time of particular visual content may be snapped or magnetized (i.e. associated or aligned with) for the multimedia presentation. In some implementations, Solution Component 190 may be configured to identify or determine a candidate moment for each focus playback timeframe identified by Focus Timeframe Component 150. That is, Solution Component 190 may be configured to identify a set of candidate moments that define a possible solution. Solution Component 190 may identify or determine candidate moment(s) in the audio content based on one or more of a musical feature hierarchy/priority, a proximity in time of a given musical feature to a target end-of-display time associated with visual content, a playback time of a musical feature selected or plausibly selectable from other focus playback timeframes, and/or any other preference or objective.

For example, in some implementations, Solution Component 190 may identify or determine a candidate moment within a focus playback timeframe by identifying the playback time associated with a moment that corresponds to the highest ranked musical feature identified within the focus playback timeframe. In some implementations, Solution Component 190 may identify or determine a candidate moment by identifying the musical feature within a given focus playback timeframe that is closest in time to the target end-of-display time for the visual content associated with the focus playback timeframe.

In some implementations, Solution Component 190 may identify or determine a candidate moment within one or more focus playback timeframe(s) by utilizing one or more cost functions that seek a solution (e.g., a set of identified moments—one for each focus playback timeframe) that maximizes a combined rank measure in accordance with a feature hierarchy. In some implementations, Solution Component 190 may identify or determine the candidate moment or moments that define a solution that minimizes proximity in time of the musical features or combinations of musical features to target-end-of display times for the visual content. To effectuate the foregoing, Solution Component 190 may seek out the musical feature(s) within focus playback timeframe(s) that correspond to the moment(s) that, if visual content were snapped/magnetized to, would reduce or increase a parameter in accordance with a predefined criteria or combination of two or more predefined criteria (e.g., rank, and/or proximity in time of the musical features or combinations of musical features to target-end-of display times).

In some implementations, Solution Component 190 may identify multiple solutions (i.e. multiple sets of identified moments for each focus playback time) that are equally or nearly equally achieve the preference or objective of interest (e.g., as defined by a cost function). In some such implementations, Solution Component 190 may be configured to provide the set of available solutions to a user, and/or receive input from a user designating which of the solutions is preferred. In some such implementations, Solution Component 190 may be configured to select the solution that reduces, and/or in some instances minimizes one or more other criteria. For example, Solution Component 190 may identify two solutions based on musical feature rank (i.e. two sets of candidate moments among the focus playback timeframes that achieve the same feature rank measure (may be a cumulative measure)). In such an instance, Solution Component 190 may then compute or identify, for each identified set of candidate moments (i.e. each solution), the proximity in playback time between each candidate moment and each target end-of-display time for each playback focus timeframe, and/or a statistical measure (e.g., average) of the foregoing proximity measures across the set, and then determine which solution reduces the statistical measure in connection with the proximity measure(s) between the two sets. In some implementations, the set of solutions solution having the lowest average proximity in time to target end-of-display times among the focus timeframes provides a desired solution. In some implementations, Solution Component 190 may be configured to select a particular solution from a set of solutions based on one or more comparisons with a reference solution and/or one or more determinations that reflect how close (in time) the individual display duration times of a set of items of visual content (for a particular solution) are to the corresponding target display duration times of the set of items of visual content.

For example, in some implementations, where a user defines the start and end time of the audio content, for any 'n' number of visual content segments (for which magnetization/synchronizing with the music is desired), there may be n−1 visual events left to sync with the music. There may be an ordered relationship defined among the possible solutions based on a predefined musical feature hierarchy. For instance, if there are 'k' ranks in the music feature hierarchy, possible solutions may be represented as tuple nEvents=(number of events with rank 1, number of events with rank 2, . . . , number of events with rank k) and a distance D (representing proximity in time) to the target durations of the segments. The relationship between nEvents may be defined as: $(x_1, x_2, \ldots, x_k)$ is better than $(y_1, y_2, \ldots, y_k)$, if for the smallest index i where $x_i \neq y_i$, $x_i > y_i$. For instance: $(3, \ldots)$ may be better than $(2, \ldots)$ and $(3, 4, \ldots)$ may be better than $(3, 3, \ldots)$ which may be better than $(2, \ldots)$, etc. In some implementations, Solution Component 190 may be configured to identify the best (or most desired in accordance with a preference, or top three highest ranked, etc.) tuple nEvents. If Solution Component 190 identifies several solutions with equivalent nEvents, Solution Component 19 may be further configured to select the solution with the smallest distance D to the target durations for a given segment (or the segments taken collectively, e.g. compared to a reference solution). Accordingly, Solution Component 190 may be configured to identify desirable solutions without looking at all possible solutions (which might be not possible to carry out in a reasonable time when the problem gets bigger (n segments≥8). In some implementations, Solution Component 190 may seek out a solution for a particular segment (or between two segments) based on the rank of the musical features (or combinations of musical features) and the distance (i.e. proximity in time) from the target duration, then proceed to seek out a solution for other segments (or segment boundaries or other visual features) until a solution for each event to which it is desired that the music be magnetized or snapped. It should be noted that Solution Component 190 may or may not work sequentially based on the order of the visual content segments to be shown. And in still further implementations, Solution Component 190 may seek out multiple solutions simultaneously to identify various overall solutions that provide an appropriate fit in accordance with given criteria (e.g., rank, timing, etc.).

In some implementations, a particular set of solutions may be considered equally desirable if their average distance in time between the individual display duration times and the corresponding target display duration times is below a predetermined threshold for the average distance in time. In some implementations, Solution Component 190 may be determined to select a particular solution from the particular set of solutions based on comparisons of the collective rank (e.g., cumulative score of rankings according to a musical feature hierarchy) of individual solutions in the particular set.

In some implementations, a particular set of solutions may be considered (virtually) equally desirable if their collective rank (e.g., cumulative score of rankings according to a musical feature hierarchy) of individual solutions in the particular set is above a predetermined threshold for collective rank and/or within a predetermined minimum threshold for difference in collective rank. For example, collective ranks within 5% of each other may be deemed (virtually) equally desirable. In some implementations, Solution Component 190 may be determined to select a particular solution from the particular set of solutions based on comparisons of the average distance in time between the individual display duration times and the corresponding target display duration times. In particular for sets of 10 or more items of visual content, determining an optimal or best solution through brute force calculations may be prohibitively costly and/or time-consuming, in particular for resource-constrained client computing platforms. In such cases, heuristics and/or approaches that find good solutions (but not a perfect solution) may be acceptable. This disclosure may be used to determine such good solutions.

One of ordinary skill in the art will appreciate that any criteria may be utilized to select a set of candidate moments within focus playback timeframes to which the end-ofdisplay times of respective visual content in the multimedia project may be snapped or magnetized (i.e. associated or aligned therewith). It should also be noted that, in some implementations, as some candidate moments are considered, chosen, or identified for given visual content, various shifts in timing information (e.g., star-of-display time, end-of-display time, duration range, target display times, focus playback timeframes, etc.) may be automatically updated/refreshed throughout the system to identify or consider the associated affects. As such, any one or more of the components identified in FIG. 1 may be configured to operate, update, or refresh itself dynamically, continuously, iteratively, periodically, or at certain intervals. For instance, if in identifying a set of candidate moments (i.e. a solution), Solution Component 190 identifies a potential candidate musical feature that occurs one second earlier than the target end-of-display time associated with the target display duration for the first visual content, consideration of other candidate features in subsequent focus timeframes may be subject to that constraint. In other words, in this instance, Dynamic Association Component 140 may be configured to shift the time segment associations for each subsequent visual content based on the identified candidate musical feature timing for the first visual content (thereby identifying or determining updated focus timeframe segments). Also, any other components that operate on information or associations made by Dynamic Association Component 140 may dynamically update or refresh to reflect such changes.

Magnetize Component 195 may be configured to snap or magnetize the end-of-display time parameter of each visual content to the candidate moment in the respective focus playback timeframe for the identified solution, and/or generate a multimedia file that contains the audio and visual information collected by Content Collection Component 110 combined, resized, and/or interleaved in a manner that reflects a solution identified by Solution Component 190.

It should be appreciated that a user may make changes (e.g., provide different input) to any one or more of the operations disclosed herein, and any one or more of the components described herein may dynamically update to reflect such changes. For example, once Magnetize Component 195 has magnetized the visual content with candidate musical features in accordance with a solution provided by Solution Component 190, the user may wish to make a change to the duration of an individual visual content segment, or choose a different solution provided by Solution Component 190, or change the audio file that the visual content is to be overlaid with, or change the order of the visual content, or add new visual content, and/or any other changes. When such changes are made by a user, the components or operations described herein may be refreshed, redetermined or otherwise updated to obtain, determine, define, identify or otherwise effectuate any one or more of the features described herein in accordance with the change. A user may wish to make several changes before Magnetize Component 195 generates a finalized multimedia file that contains the audio and visual content interleaved in the manner the user desires. All such functionality and capabilities should be understood to be captured by the present disclosure.

As depicted in FIG. 1, in some implementations, system 1000 may include a GUI Component 200. GUI Component 200 may be configured to provide a graphical user interface operable to enable a user to interact with and/or provide input to any one or more of components 100-195 of system 1000. GUI Component 200 may be operatively coupled with any one or more of the elements of system 1000, and may gather or provide information between any of the foregoing. It should be noted that any one or more of the components 100-195 may be configured to define display objects for display in a graphical user interface, the display objects representing or symbolizing one or more features, options, indications, measures, or any related information available within system 1000. Though not exhaustive, various examples of such display objects are provided below with reference to FIG. 2. One of ordinary skill in the art will appreciate that other display objects associated with other features, options, indications, measures, or otherwise may be defined and/or provided in connection with GUI Component 200 and with any one or more of components 100-195 without departing from the spirit and scope of the present disclosure.

Figure 2:
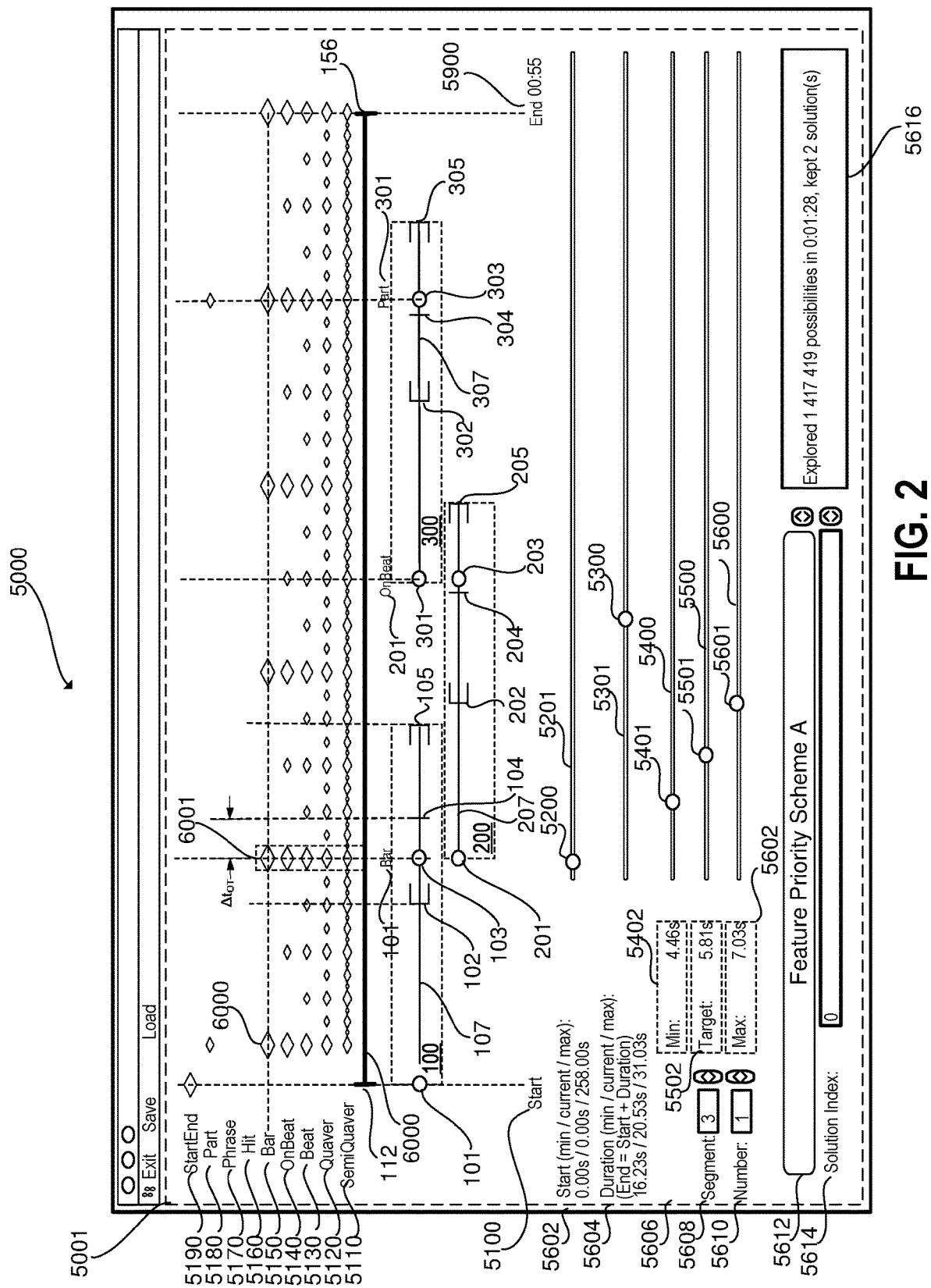
FIG. 2 illustrates an exemplary graphical user interface that may be operatively coupled with a system for synchronizing transitions and/or events in visual content with musical features in audio content in accordance with one or more implementations of the present.

FIG. 2 illustrates an exemplary graphical user interface 5000 which may be provided, generated, defined, or transmitted—in whole or in part—by GUI Component 200 in accordance with some implementations of the present disclosure. GUI Component 200 may transmit display arrangement information for display on a display device with which an exemplary implementation of system 1000 may be operatively coupled. As shown, interface 5000 may include one or more dynamic display panes, e.g., 5001 configured for displaying visual representation(s) (e.g., textual or graphical representations) of any audio content information, video content information, timing information, duration information, time segment information, timeframe information, magnetizing/snapping information, user input tools and/or information, solution information, user selection options, musical feature information, and/or any other information provided, created, obtained, identified, determined, established, or generated by any one or more of the components of system 1000 depicted in FIG. 1.

As depicted in FIG. 2, GUI 5000 may display one or more visual objects indicating audio timing. For example, pane 5001 may include a audio playback timeline 6000 demarking or otherwise indicating playback times/duration of the audio content obtained by Content Collection Component 110, e.g., where different positions along the length of playback timeline 6000 correspond to different playback times of the audio content or samples of the audio content information. The playback start time and end time represented by the playback timeline 6000 may be indicated by an textual or graphical symbol, e.g., by numeric duration indicator 5900 (e.g., time=00:55 in the depicted example), or with a tic mark or other symbolic indicator. Tic mark marker 112 may correspond to the temporal beginning of the audio content information (e.g., time=00:00 in the depicted example), and tic mark marker 156 may correspond to the temporal end of the audio content information (e.g., time=00:30 in the depicted example). Either one of the temporal beginning and/or temporal end of the audio content may be adjusted by a user for purposes of the multimedia presentation.

As depicted, GUI 5000 may display one or more visual objects indicating visual content display timing and/or duration information. Visual content, or information associated therewith, may be represented by one or more visual indicators as shown within/by boxes 100, 200, and 300 of FIG. 2. For example, pane 5001 may include visual display timelines 107, 207, 307 representing timing information and/or duration information about visual content chosen for the multimedia project under development. As shown, the visual content display order information defined by Display Order Component 130 may be represented, at least in part, by the horizontal displacement between display timelines 107, 207, and 307, and/or the relative positioning of display timelines 107 with respect the audio playback timeline 6000. Other information may also be depicted with respect to visual content, as depicted within boxes 100, 200, and 300. For instance, opening brackets 102, 202, 302 may indicate minimum duration times, and closing brackets 105, 205, 305 may indicate maximum display duration times defined via Timing Parameter Component 120 for visual content 100, 200, and 300 respectively. Line objects 104, 204, 304 may indicate the target end-of-display times (based on target duration information) for each of visual content 100, 200, and 300 respectively. Objects 101, 201, 301 may denote a start-of-display times for each visual content, objects 103, 203, and 303 may denote a candidate end-of-display time to which visual content may be snapped (e.g., for each visual content in accordance with a candidate musical feature or combination of musical features identified by Solution Component 190).

As further depicted in FIG. 2, GUI 5000 may include one or more interactive user input tools. For example, as shown, GUI 5000 may include slider bars 5201, 5300, 5401, 5501 and 5601 enabling users to engage/move control objects 5200, 5300, 5400, 5500 and 5600 along the length of such slider bars to modify/adjust/define certain parameters that may be received by and/or utilized within system 1000, e.g., start-of-playback time 5202; multimedia project duration time 5604; minimum display duration time 5402, target display duration time 5502, and maximum display duration time for a given visual content (e.g., individual media segment 5610 (number 1, the first segment) of the total number of segments 5608 (total=3 segments) in the project). GUI 5000 may also include buttons, selection tools, and or identifiers associated with the musical feature priority preferences or hierarchical ranking scheme being applied, e.g., feature priority selection tool 5612 depicting that Feature Priority Scheme A has been selected and/or is being applied.

As further depicted in FIG. 2, GUI 5000 may include a visual depiction or representation of one or more musical features detected by Musical Feature Component 160. For instance, display objects of one or more sizes, shapes, colors, etc. (here, all diamond shaped) may be displayed in a position of the interface that indicates the time location of their occurrence within the audio content playback (depicted here by the relative horizontal position of the display object in relation to the audio timeline), as well as the type of musical feature (depicted here by the relative vertical position of the display object in relation to the vertically aligned musical feature key including, e.g., labels for start/end points 5190, parts 5180, phrases 5170, hits 5160, bars 5150, onbeats 5140, beats 5130, quavers 5120, and semiquavers 5110. As shown, by viewing GUI 5000, a user may readily ascertain the candidate musical feature the system 1000 has identified for each segment of visual content. For instance, in the case of visual content represented by display objects in box 100, the visual content end-of-display timing is snapped (for this particular solution), to the moment in the audio playback associated with the combination of musical features within box 6001 (as that is the moment with which object 103 is aligned). In some implementations, the GUI 5000 will depict a textual indication as to what feature was the controlling/deciding factor in selecting the candidate musical feature to which the end-of-display time for each visual content may be snapped/magnetized (e.g., textual indications 101, 201, and 301). In some implementations, a visual or numeric indication may be provided that denotes or otherwise indicates the distance/proximity in time, $\Delta t_{OT}$, that exists between the playback time associated with the candidate musical feature and the end-of-display/end-of-playback time associated with the target duration time of the given visual content (as shown in connection with visual content 100). As will be appreciated by one of ordinary skill in the art, any other objects, tools, or buttons may be provided via GUI 5000 to interact with the other components or elements of system 1000. Any one or more of the objects, tools, or features described above may be refreshed or updated dynamically. For instance, a user may move control object 5501 to increase the targeted duration time for a given visual content, and such a change may be automatically reflected in GUI 5000 based on changes, updates, and new determinations made by one or more other components of system 1000.

Figure 3:
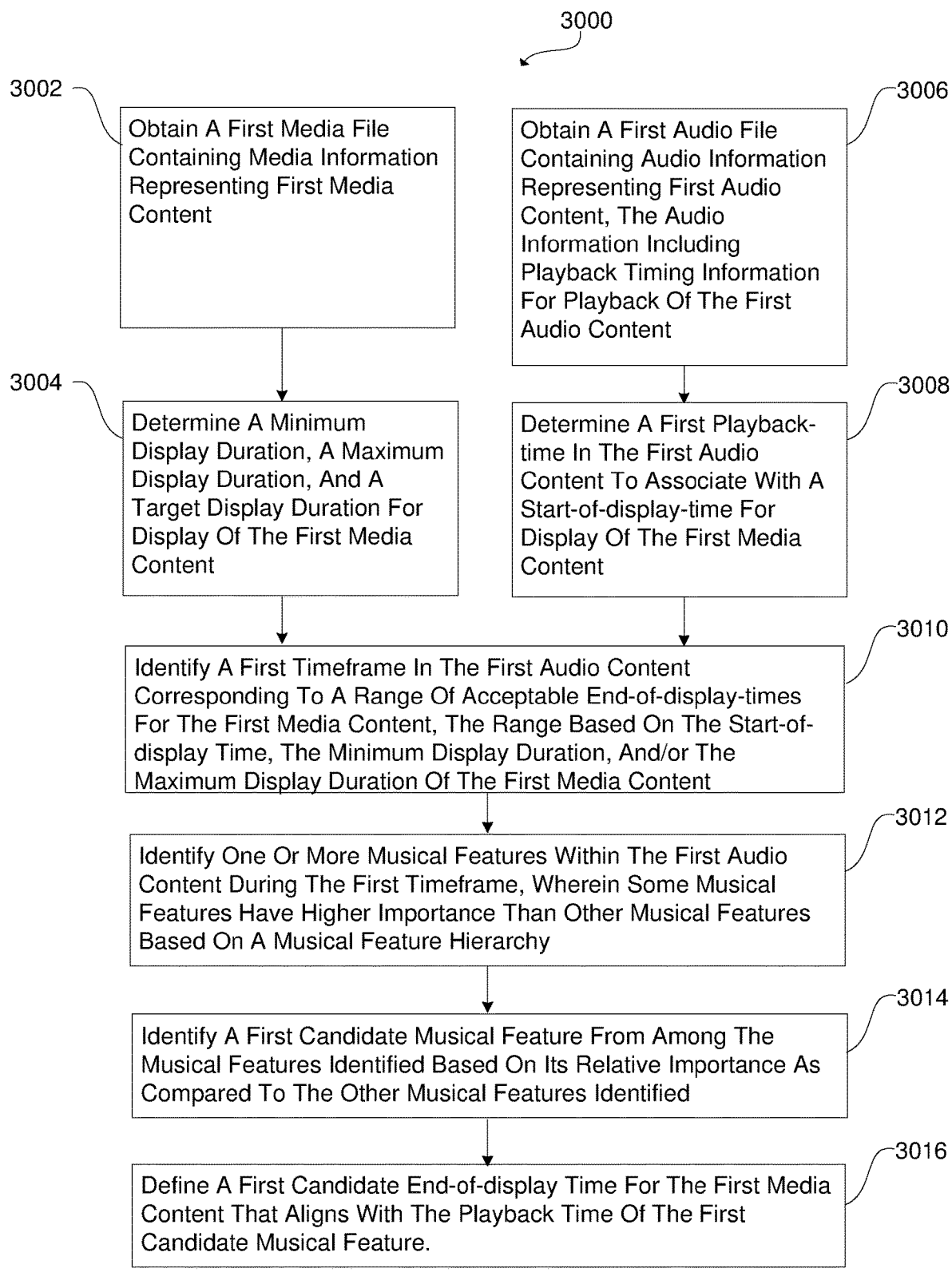
FIG. 3 illustrates an exemplary method for synchronizing transitions and/or events in visual content with musical features in audio content in accordance with one or more implementations of the present disclosure.

FIG. 3 illustrates an exemplary method for intelligently synchronizing events in visual content with musical features in audio content in accordance with one or more implementations of the present disclosure. At operation 3002, method 3000 may obtain a first media file containing visual content information representing first visual content. At operation 3004, method 3000 may determine a minimum display duration, a maximum display duration, and a target display duration for display of the first visual content. At operation 3006, method 3000 may obtain a first audio file containing audio information representing first audio content, the audio information including playback timing information for playback of the first audio content. At operation 3008, method 3000 may determine a first playback-time in the first audio content to associate with a start-of-display-time for display of the first visual content. First playback-time may be the default beginning of the audio content file, or be a start-of-playback time defined in accordance with input from a user. At operation 3010, method 3000 may identify a timeframe in the first audio content corresponding to a range of acceptable end-of-display-times for the first visual content, the range based on the start-of-display time, the minimum display duration, and/or the maximum display duration of the first visual content. At operation 3012, method 3000 may identify one or more musical features within the first audio content during the first timeframe, wherein some musical features have higher importance than other musical features based on a musical feature hierarchy. At operation 3014, method 3000 may identify a first candidate musical feature from among the musical features identified based on its relative importance as compared to the other musical features identified. At operation 3016, method 3000 may define a first candidate end-of-display time for the first visual content that aligns with the playback time of the first candidate musical feature.

Figure 4:
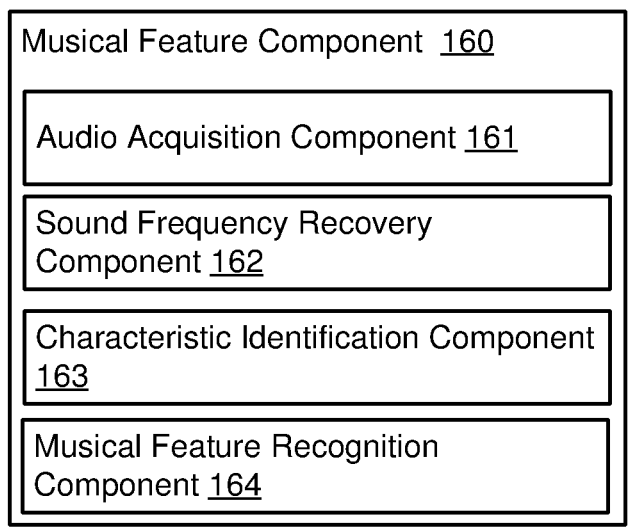
FIG. 4 illustrates exemplary system components for detecting musical features in audio content to which transitions and/or events in visual content may be synchronized in accordance with one or more implementations of the present disclosure.

Referring back to Musical Feature Component 160 introduced in connection with FIG. 1, it should be noted that while a user may manually input (some of) the necessary musical feature identification information about the audio content (via user interface, e.g., GUI 5000), in some implementations, Musical Feature Component 160 is configured to automatically and/or intelligently detect musical features in accordance with one or more implementations of the present disclosure. FIG. 4 illustrates exemplary subcomponents of Musical Feature Component 160 (which may be referred to as components) for detecting musical features associated with audio content in accordance with one or more implementations of the present disclosure. As depicted, Musical Feature Component 160 may include or be operatively coupled with one or more components to aid in effectuating feature detection in one or more implementations of the present disclosure, including Audio Acquisition Component 161, Sound Frequency Recovery Component 162, Characteristic Identification Component 163, Musical Feature Recognition Component 164.

Audio Acquisition Component 161 may be configured to obtain and/or open digital audio files (which may include digital audio streams) to access digital audio content information contained therein, the digital audio content information representing audio content. Audio Acquisition Component 161 may include a software audio codec configured to decode the audio digital audio content information obtained from a digital audio container (i.e. a digital audio file). Audio Acquisition Component 161 may acquire the digital audio information in any manner (including from another source), or it may generate the digital audio information based on analog audio (e.g., via a hardware codec) such as sounds/air vibrations perceived via a hardware component operatively coupled therewith (e.g., microphone). In some implementations, Audio Acquisition Component 161 may operate at the conjunction with, at the direction of, or in parallel with Content Collection Component 110.

In some implementations, Audio Acquisition Component 161 may be configured to copy or download digital audio files from one or more of server(s) 1600, online platform(s) 1700, external resource(s) 1800 and/or electronic storage 1200. For instance, a user may engage audio acquisition component (directly or indirectly) to select, purchase and/or download a song (contained in a digital audio file) from an online platform such as the iTunes store or Amazon Prime Music. Audio Acquisition Component 161 may store/save the downloaded audio for later use (e.g., in/on electronic storage 1200). Audio Acquisition Component 161 may be configured to obtain the audio content information contained within the digital audio file by, for example, opening the file container and decoding the encoded audio content information contained therein.

In some implementations, Audio Acquisition Component 161 may obtain digital audio information by directly generating raw data (e.g., machine readable code) representing electrical signals provided or created by a transducer (e.g., signals produced via an acoustic-to-electrical transduction device such as a microphone or other sensor based on perceived air vibrations in a nearby environment (or in an environment with which the device is perceptively coupled)). That is, Audio Acquisition Component 161 may obtain, in some implementations, the audio content information by creating itself rather than obtaining it from a pre-coded audio file from elsewhere. In particular, Audio Acquisition Component 161 may be configured to generate a machine-readable representation (e.g., binary) of electrical signals representing analog audio content. In some such implementations, Audio Acquisition Component 161 is operatively coupled to an acoustic-to-electrical transduction device such as a microphone or other sensor to effectuate such features. In some implementations, Audio Acquisition Component 161 may generate the raw data in real time or near real time as electrical signals representing the perceived audio content are received.

Sound Frequency Recovery Component 162 may be configured to determine, detect, measure, and/or otherwise identify one or more frequency measures encoded within or otherwise associated with one or more samples of the digital audio content information. As used herein, the term "frequency measure" may be used interchangeably with the term "frequency measurement". Sound Frequency Recovery Component 162 may identify a frequency spectrum for any one or more samples by performing a discrete-time Fourier transform, or other transform or algorithm to convert the sample data into a frequency domain representation of one or more portions of the digital audio content information. In some implementations, a sample may only include one frequency (e.g., a single distinct tone), no frequency (e.g., silence), and/or multiple frequencies (e.g., a multi-instrumental harmonized musical presentation). In some implementations, Sound Frequency Recovery Component 162 may include a frequency lookup operation where a lookup table is utilized to determine which frequency or frequencies are represented by a given portion of the decoded digital audio content information. There may be one or more frequencies identified/recovered for a given portion of digital audio content information (e.g., the frequencies apparent at a given playback time, or segment of playback time of the audio content). Sound Frequency Recovery Component 162 may recover or identify any and/or all of the frequencies associated with audio content information in a digital audio file. In some implementations, frequency measures may include values representative of the intensity, amplitude, and/or energy encoded within or otherwise associated with one or more samples of the digital audio content information. In some implementations, frequency measures may include values representative of the intensity, amplitude, and/or energy of particular frequency ranges.

Characteristic Identification Component 163 may be configured to identify one or more characteristics about a given sample based on: frequency measure(s) identified for that particular sample, frequency measure(s) identified for any other one or more samples in comparison to frequency measure(s) identified with the given sample, recognized patterns in frequency measure(s) across multiple samples, and/or frequency attributes that match or substantially match (i.e. within a predefined threshold) with one or more preset frequency characteristic templates provided with the system and/or defined by a user. A frequency characteristic template may include a frequency profile that describes a pattern that has been predetermined to be indicative of a significant or otherwise relevant attribute in audio content. Characteristic Identification Component 163 may employ any set of operations and/or algorithms to identify the one or more characteristics about a given sample, a subset of samples, and/or all samples in the audio content information.

For example, in some implementations, Characteristic Identification Component 163 may employ a Hidden Markov Model to detect state changes in frequency measures that reflect one or more attributes about the represented audio content (e.g., representing parts, or changes in parts throughout the audio content). In some implementations, Characteristic Identification Component 163 may operate in a manner similar to the operation of "characteristic identification component 1430", and/or "musical feature component 1440" described in the Musical Feature Application.

In some implementations, Characteristic Identification Component 163 may be configured to determine a pace and/or tempo for some or all of the digital audio content information. For example, a particular (portion of a) song may be associated with a particular tempo. Such as tempo may be described by a number of beats per minute, or BPM.

For example, Characteristic Identification Component 163 may be configured to determine whether the intensity, amplitude, and/or energy in one or more particular frequency ranges is decreasing, constant, or increasing across a particular period. For example, a drop may be characterized by an increasing intensity spanning multiple bars followed by a sudden and brief decrease in intensity (e.g., a brief silence). For example, the particular period may be a number of samples, an amount of time, a number of beats, a number of bars, and/or another unit of measurement that corresponds to duration. In some implementations, the frequency ranges may include bass, middle, and treble ranges. In some implementations, the frequency ranges may include about 5, 10, 15, 20, 25, 30, 40, 50 or more frequency ranges between 20 Hz and 20 kHz (or in the audible range). In some implementations, one or more frequency ranges may be associated with particular types of instrumentation. For example, frequency ranges at or below about 300 Hz (this may be referred to as the lower range) may be associated with percussion and/or bass. In some implementations, one or more beats having a substantially lower amplitude in the lower range (in particular in the middle of a song) may be identified as a percussive gap. The example of 300 Hz is not intended to be limiting in any way. As used herein, substantially lower may be implemented as 10%, 20%, 30%, 40%, 50%, and/or another percentage lower than either immediately preceding beats, or the average of all or most of the song. A substantially lower amplitude in other frequency ranges may be identified as a particular type of gap. For example, analysis of a song may reveal gaps for certain types of instruments, for singing, and/or other components of music.

Musical Feature Recognition Component 164 may be configured to identify a musical feature that corresponds to a frequency characteristic identified by Characteristic Identification Component 163. Musical Feature Recognition Component 164 may utilize a frequency characteristic database that defines, describes or provides one or more predefined musical features that correspond to a particular frequency characteristic. The database may include a lookup table, a rule, an instruction, an algorithm, or any other means of determining a musical feature that corresponds to an identified frequency characteristic. For example, a state change identified using a Hidden Markov Model may correspond to a "part" within the audio content information. In some implementations, Musical Feature Recognition Component 164 may operate in a manner similar to the operation of "characteristic identification component 1430", and/or "musical feature component 1440" described in the Musical Feature Application. In some implementations, Musical Feature Recognition Component 164 may be configured to receive input from a user who may listen to and manually (e.g., using a peripheral input device such as a mouse or a keyboard) identify that a particular portion of the audio content being played back corresponds to a particular musical feature (e.g., a beat) of the audio content. In some implementations, Musical Feature Recognition Component 164 may identify a musical feature of audio content based, in whole or in part, on one or more other musical features identified in connection with the audio content. For example, Musical Feature Recognition Component 164 may detect beats and parts associated with the audio content encoded in a given audio file, and Musical Feature Recognition Component 164 may utilize one or both of these musical features (and/or the timing information, the frequency measure, and/or the characteristic information associated with the musical feature) to identify other musical features such as bars, onbeats, quavers, semi-quavers, and/or other musical features. For example, in some implementations, the system may identify musical features by extrapolating such information from the timing information determined in association with beats and/or parts previously identified. In some instances the beat timing and the associated time measure of the song provide adequate information for Musical Feature Component 160 to determine an estimate of where (in the audio playback timeline) the bars, onbeats, quavers, and/or semiquavers must occur (or are most likely to occur, or are expected to occur). In some implementations, identification of beats may be based on analysis of frequency measures that include values representative of the intensity, amplitude, and/or energy encoded within or otherwise associated with one or more samples of the digital audio content information. Identification of the bars, onbeats, quavers, and/or semiquavers may be based on analysis of previously identified beats. For example, a bar may include 2, 3, 4, 5, 6, 7, 8, and/or another number of beats, depending on the time signature of the audio content. For example, quavers and semiquavers may be derived by dividing the time between beats as appropriate for the time signature of the audio content.

Figure 5:
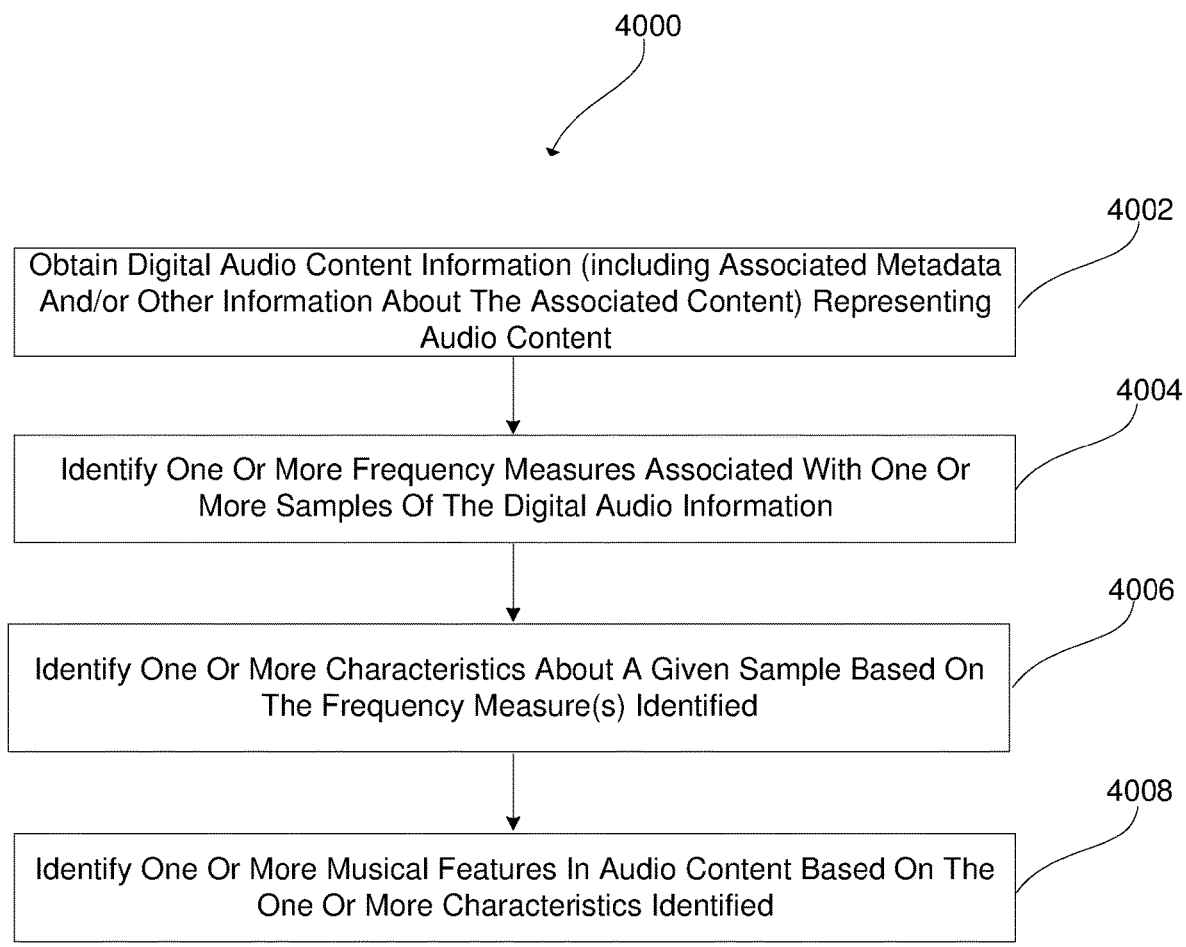
FIG. 5 illustrates an exemplary method for detecting musical features in audio content to which transitions and/or events in visual content may be synchronized in accordance with one or more implementations of the present disclosure.

FIG. 5 illustrates exemplary method for detecting musical features associated with audio content in accordance with one or more implementations of the present disclosure. FIG. 5 illustrates a method 4000 that may be implemented by system 1000 in operation. At operation 4002, method 4000 may obtain digital audio content information (including associated metadata and/or other information about the associated content) representing audio content. At operation 4004, method 4000 may identify one or more frequency measures associated with one or more samples (i.e. discrete moments) of the digital audio content information. At operation 4006, method 4000 may identify one or more characteristics about a given sample based on the frequency measure(s) identified for that particular sample and/or based on the frequency measure(s) identified for any other one or more samples in comparison to the given sample, and/or based upon recognized patterns in frequency measure(s) across multiple samples. At operation 4008, method 4000 may identify one or more musical features in audio content based on the one or more characteristics identified.

Referring back now to FIG. 1, it should be noted that client computing platform(s) 1100, server(s) 1600, online sources 1700, and/or external resources 1800 or components thereof may be operatively linked via one or more electronic communication links 1500. For example, such electronic communication links may be established, at least in part, via a network such as the Internet and/or other networks. It will be appreciated that this is not intended to be limiting and that the scope of this disclosure includes implementations in which client computing platform(s) 1100, server(s) 1600, online sources 1700, and/or external resources 1800 may be operatively linked via some other communication media.

In some implementations, client computing platform(s) 1100 may be configured to provide remote hosting of the features and/or function of computer readable instructions 1400 to one or more server(s) 1600 that may be remotely located from client computing platform(s) 1100. However, in some implementations, one or more features and/or functions of client computing platform(s) 1100 may be attributed as local features and/or functions of one or more server(s) 1600. For example, individual ones of server(s) 1600 may include machine-readable instructions (not shown in FIG. 1) comprising the same or similar components as computer readable instructions 1400 of client computing platform(s) 1100. Server(s) 1600 may be configured to locally execute the one or more components that may be the same or similar to the computer readable instructions 1400. One or more features and/or functions of computer readable instructions 1400 of client computing platform(s) 1100 may be provided, at least in part, as an application program that may be executed at a given server 1100. One or more features and/or functions of computer readable instructions 1400 of client computing platform(s) 1100 may be provided, at least in part, in one or more computer program components as provided herein, any one or more of components may take on the functionality and/or perform the features detailed for any one or more of the other components. A single computer program component may be provided to execute and effectuate any one or more of the functionality/features described herein.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

I claim:

1. A system for synchronizing visual content with musical features in audio content, the system comprising:
one or more physical computer processors configured by computer readable instructions to:
obtain a first media file containing first visual information defining first visual content;
obtain a minimum display duration, a maximum display duration, and a target display duration for display of the first visual content;
obtain an audio file containing audio information representing audio content;
determine a first playback-time in the audio content to associate with a start-of-display time for display of the first visual content;
identify a range of acceptable end-of-display times for the first visual content based on the start-of-display time, the minimum display duration, and/or the maximum display duration of the first visual content, the range of acceptable end-of-display times for the first visual content corresponding to a first timeframe in the audio content;
identify a target end-of-display time of the first visual content based on the start-of-display time and the target display duration of the first visual content;
identify relative importance of musical features within the audio content during the first timeframe based on a musical feature hierarchy;
select a first musical feature from among the musical features within the audio content during the first timeframe based on (1) its relative importance in accordance with the musical feature hierarchy, and (2) its relative proximity in time to the target end-of-display time of the first visual content as compared to other musical features; and
determine a first end-of-display time for the first visual content that aligns with a playback time of the first musical feature.

2. The system of claim 1, wherein the start-of-display time for the first visual content is defined by a user.

3. The system of claim 1, wherein the one or more physical computer processors are further configured by computer readable instructions to:
obtain a second media file containing second visual information defining second visual content;
determine a minimum display duration, a maximum display duration, and a target display duration for display of the second visual content;
determine a second playback-time in the audio content to associate with a start-of-display time for display of the second visual content;
identify a range of acceptable end-of-display times for the second visual content based on the start-of-display time, the minimum display duration, and/or the maximum display duration of the second visual content, the range of acceptable end-of-display times for the second visual content corresponding to a second timeframe in the audio content;
identify a target end-of-display time of the second visual content based on the start-of-display time and the target display duration of the second visual content;
identify relative importance of musical features within the audio content during the second timeframe based on the musical feature hierarchy;
select a second musical feature from among the musical features within the audio content during the second timeframe based on (1) its relative importance in accordance with the musical feature hierarchy, and (2) its relative proximity in time to the target end-of-display time of the second visual content as compared to other musical features; and
determine a second end-of-display time for the second visual content that aligns with a playback time of the second musical feature.

4. The system of claim 3, wherein the second timeframe in the audio content is adjacent to the first timeframe.

5. The system of claim 3, wherein a combination of a first duration from the start-of- display time of the first visual content until the first end-of-display time for the first visual content and a second duration from the start-of-display-time of the second visual content until the second end-of-display time for the second visual content matches a total playback time of the audio content.

6. The system of claim 3, wherein the first musical feature and the second musical feature are selected such that an average of the proximity in time between the playback time of the first musical feature and the target-end of display time for the first visual content, and proximity in time between the playback time of the second musical feature and the target-end of display time for the second visual content is minimized.

7. The system of claim 3, wherein the start-of-display time and the end-of-display time for the first visual content is defined by a user.

8. A method for synchronizing transitions in visual content with musical features in audio content, the method comprising:
obtaining a first media file containing first visual information defining first visual content;
determining a minimum display duration, a maximum display duration, and a target display duration for display of the first visual content;
obtaining an audio file containing audio information representing audio content;
determining a first playback-time in the audio content to associate with a start-of-display-time for display of the first visual content;
identifying a range of acceptable end-of-display times for the first visual content based on the start-of-display time, the minimum display duration, and/or the maximum display duration of the first visual content, the range of acceptable end-of-display times for the first visual content corresponding to a first timeframe in the audio content;

identifying a target end-of-display time of the first visual content based on the start-of-display time and the target display duration of the first visual content;

identifying relative importance musical features within the audio content during the first timeframe based on a musical feature hierarchy;

selecting a first musical feature from among the musical features within the audio content during the first timeframe based on (1) its relative importance in accordance with the musical feature hierarchy, and (2) its relative proximity in time to the target end-of-display time of the first visual content as compared to other musical features; and determining a first end-of-display time for the first visual content that aligns with a playback time of the first musical feature.

9. The method of claim 8, wherein start-of-display time for the first visual content is defined by a user.

10. The method of claim 8, further comprising:

obtaining a second media file containing second visual information defining second visual content;

determining a minimum display duration, a maximum display duration, and a target display duration for display of the second visual content;

determining a second playback-time in the audio content to associate with a start-of-display-time for display of the second visual content;

identifying a range of acceptable end-of-display times for the second visual content based on the start-of-display time, the minimum display duration, and/or the maximum display duration of the second visual content, the range of acceptable end-of-display times for the second visual content corresponding to a second timeframe in the audio content;

identifying a target end-of-display time of the second visual content based on the start-of-display time and the target display duration of the second visual content;

identifying relative importance of musical features within the audio content during the second timeframe based on the musical feature hierarchy;

selecting a second musical feature from among the musical features within the audio content during the second timeframe based on (1) its relative importance in accordance with the musical feature hierarchy, and (2) its relative proximity in time to the target end-of-display time of the second visual content as compared to other musical features; and determining a second end-of-display time for the second visual content that aligns with a playback time of the second musical feature.

11. The method of claim 10, wherein the second timeframe in the audio content is adjacent to the first timeframe.

12. The method of claim 10, wherein a combination of a first duration from the start-of-display time of the first visual content until the first end-of-display time for the first visual content and a second duration from the start-of-display-time of the second visual content until the second end-of-display time for the second visual content matches a total playback time of the audio content.

13. The method of claim 10, wherein the first musical feature and the second musical feature are selected such that an average of the proximity in time between the playback time of the first musical feature and the target-end of display time for the first visual content, and proximity in time between the playback time of the second musical feature and the target-end of display time for the second visual content is minimized.

14. The method of claim 10, wherein the start-of-display time and the end-of-display time for the first visual content is defined by a user.

15. A system for synchronizing transitions in visual content with musical features in audio content, the system comprising:

one or more physical computer processors configured by computer readable instructions to:

obtain multiple media files containing visual information representing visual content;

define a display order for the visual content of the multiple media files;

define a minimum display duration, a maximum display duration, and a target display duration for display of the visual content of the multiple media files;

obtain an audio file containing audio information representing audio content;

define a first playback-time in the audio content as a start-of-display time for display of the visual content in accordance with the display order;

identify a range of acceptable end-of-display times for individual ones of the visual content of the multiple media files based on the start-of-display time, the minimum display duration, and/or the maximum display duration for the individual ones of the visual content of the multiple media files, the ranges of acceptable end-of-display times for the visual content of the multiple media files corresponding to timeframes in the audio content;

identify a target end-of-display times of the individual ones of the visual content of the multiple media files based on the start-of-display time and the target display duration of the individual ones of the visual content of the multiple media files;

identify relative importance of musical features within the audio content during the timeframes based on a musical feature hierarchy;

select a musical feature within individual ones of the timeframes based on (1) its relative importance as compared to the other identified musical features, and (2) its relative proximity in time to a corresponding target end-of-display time of the visual content as compared to other musical features; and determine an end-of-display time for the individual ones of the visual content of the multiple media files, wherein the end-of-display time aligns with a playback time of the musical feature within a corresponding timeframe.

16. The system of claim 15, wherein the start-of-display time is defined by a user.

17. The system of claim 15, wherein the multiple media files include a first media file and a second media file, the first media file containing first visual information defining first visual content and the second media file containing second visual information defining second visual content.

18. The system of claim 17, wherein:

a first musical feature is selected for the first visual content and a second musical feature is selected for the second visual content; and the first musical feature and the second musical feature are selected such that an average of the proximity in time between a playback time of the first musical feature and the target-end of display time for the first visual content, and proximity in time between a playback time of the second musical feature and the target-end of display time for the second visual content is minimized.

19. The system of claim 17, wherein the timeframes in the audio content include a first timeframe for the first visual content and a second timeframe for the second visual content, the second timeframe adjacent to the first timeframe.

20. The system of claim 17, wherein a combination of a first duration from the start-of-display time of the first visual content until the first end-of-display time for the first visual content and a second duration from the start-of-display-time of the second visual content until the second end-of-display time for the second visual content matches a total playback time of the audio content.

* * * * *